United States Patent
Okamoto et al.

(10) Patent No.: US 8,233,769 B2
(45) Date of Patent: Jul. 31, 2012

(54) CONTENT DATA PROCESSING DEVICE, CONTENT DATA PROCESSING METHOD, PROGRAM, AND RECORDING/ PLAYING DEVICE

(75) Inventors: Hiroshige Okamoto, Kanagawa (JP); Masaru Miyamoto, Tokyo (JP)

(73) Assignee: Sony Corporation (JP)

( * ) Notice: Subject to any disclaimer, the term of this patent is extended or adjusted under 35 U.S.C. 154(b) by 402 days.

(21) Appl. No.: 12/583,738

(22) Filed: Aug. 25, 2009

(65) Prior Publication Data
US 2010/0054705 A1    Mar. 4, 2010

(30) Foreign Application Priority Data
Sep. 1, 2008 (JP) ................................ P2008-223425

(51) Int. Cl.
| | |
|---|---|
| H04N 9/80 | (2006.01) |
| H04N 9/83 | (2006.01) |
| G11B 27/00 | (2006.01) |
| H04N 7/18 | (2006.01) |
| H04N 5/232 | (2006.01) |
| H04N 7/12 | (2006.01) |
| H04N 11/02 | (2006.01) |
| H04N 11/04 | (2006.01) |
| G03B 13/00 | (2006.01) |

(52) U.S. Cl. ........ 386/242; 386/239; 386/278; 386/281; 348/154; 348/155; 348/352; 348/407.1

(58) Field of Classification Search ............... 386/239, 386/242, 278, 281; 348/154, 155, 352, 407.1
See application file for complete search history.

(56) References Cited

U.S. PATENT DOCUMENTS
| | | | |
|---|---|---|---|
| 6,748,158 B1 * | 6/2004 | Jasinschi et al. | 386/241 |
| 2009/0067807 A1 * | 3/2009 | Hirohata et al. | 386/52 |

FOREIGN PATENT DOCUMENTS
| | | |
|---|---|---|
| JP | 2000-261754 A | 9/2000 |
| JP | 2002-344872 A | 11/2002 |
| JP | 2005167377 A | 6/2005 |
| JP | 2005277531 A | 10/2005 |
| JP | 2006-054619 A | 2/2006 |
| WO | 2009060507 A1 | 5/2009 |

OTHER PUBLICATIONS
Office Action from Japanese Application No. 2008-223425, dated Jul. 20, 2010.

* cited by examiner

*Primary Examiner* — Daquan Zhao
(74) *Attorney, Agent, or Firm* — Lerner, David, Littenberg, Krumholz & Mentlik, LLP

(57) ABSTRACT

A content data processing device includes: a stability score computing unit to compute a stability score corresponding to the stability of an image for each frame, based on the image data of each frame making up content data; and a playing segment selecting unit to select a playing segment from the content data based on the stability score computed with the stability score computing unit.

14 Claims, 17 Drawing Sheets

AVERAGE DC COEFFICIENT

EXAMPLE OF CONTENT DATA AND APPENDED ID

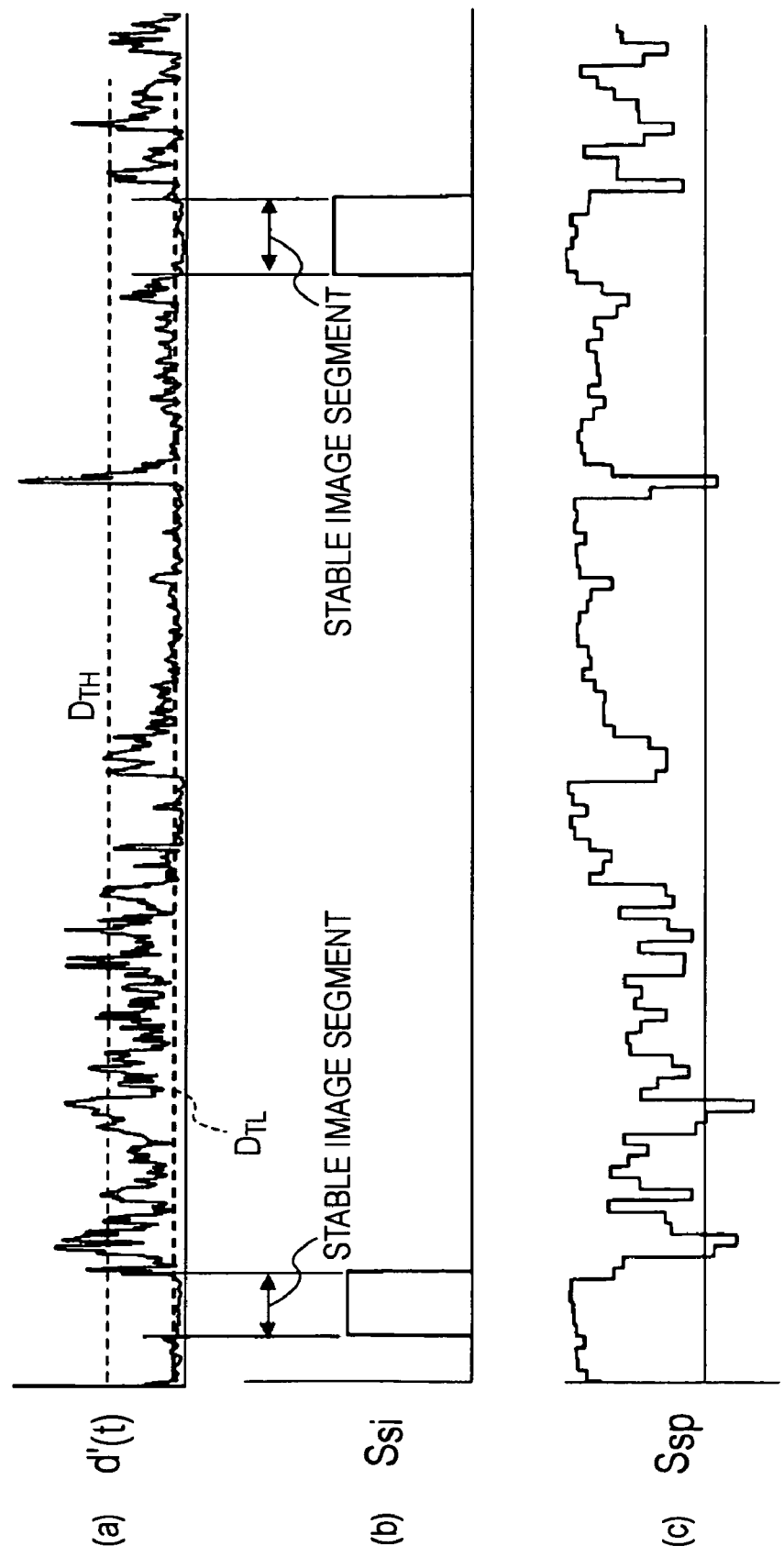

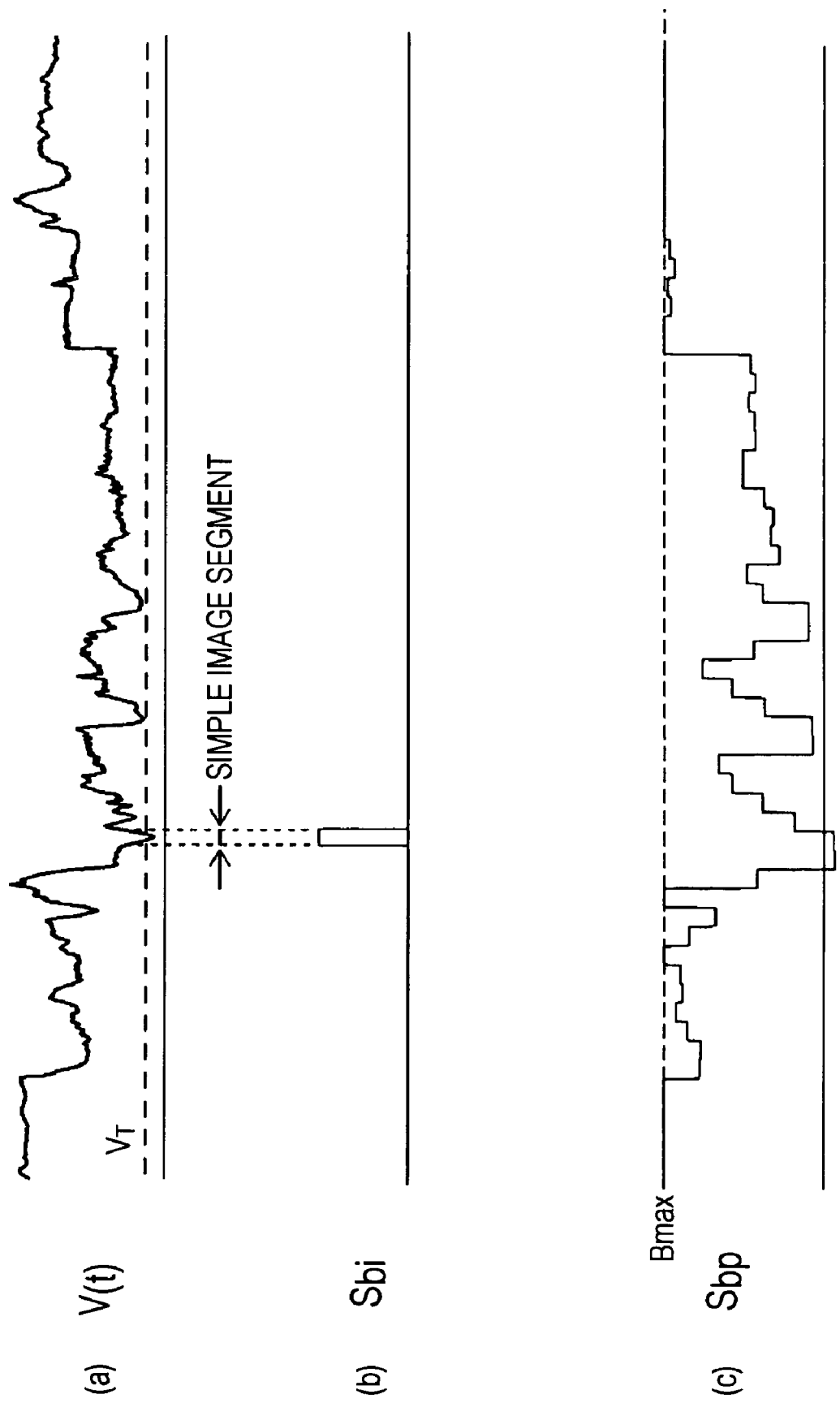

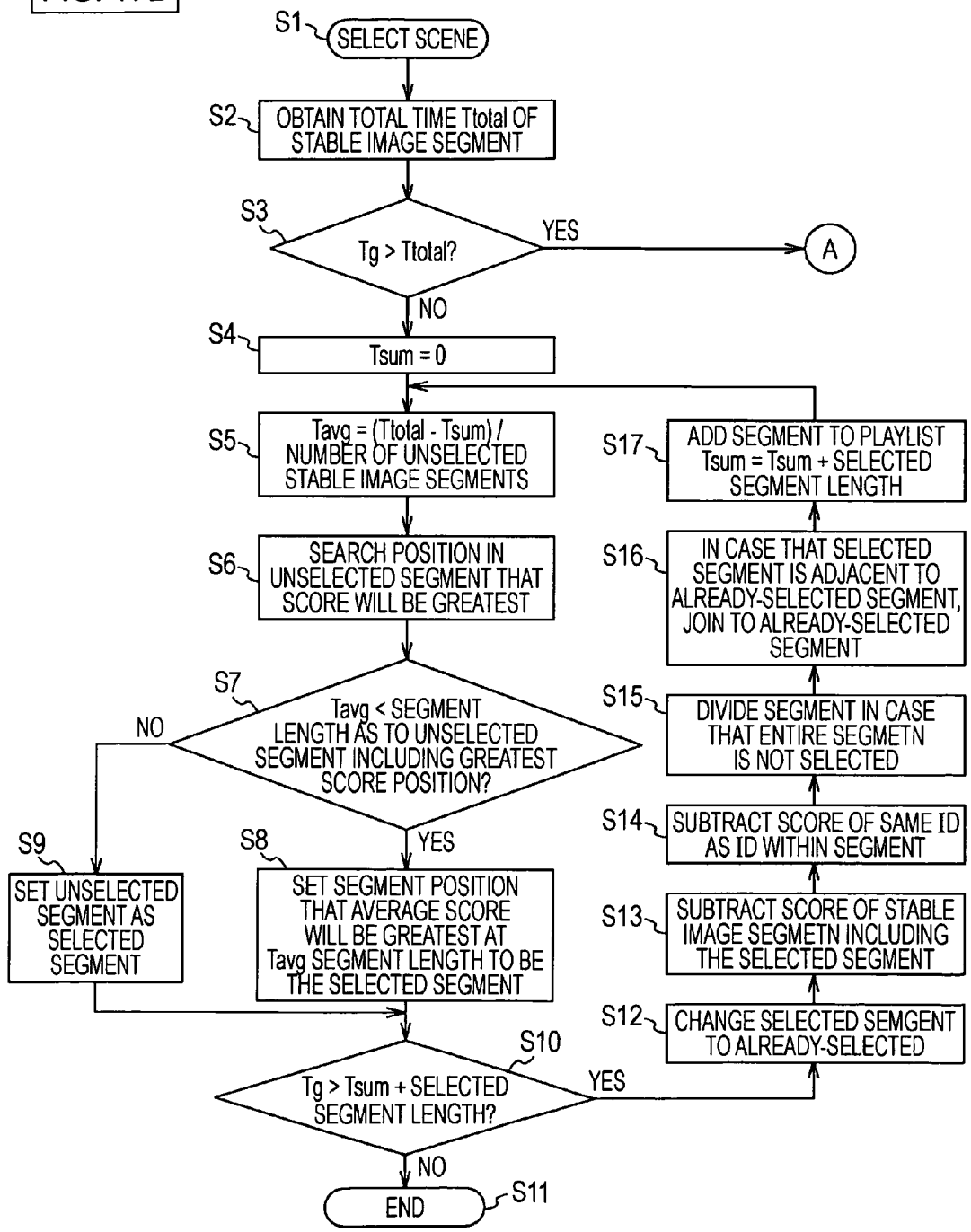

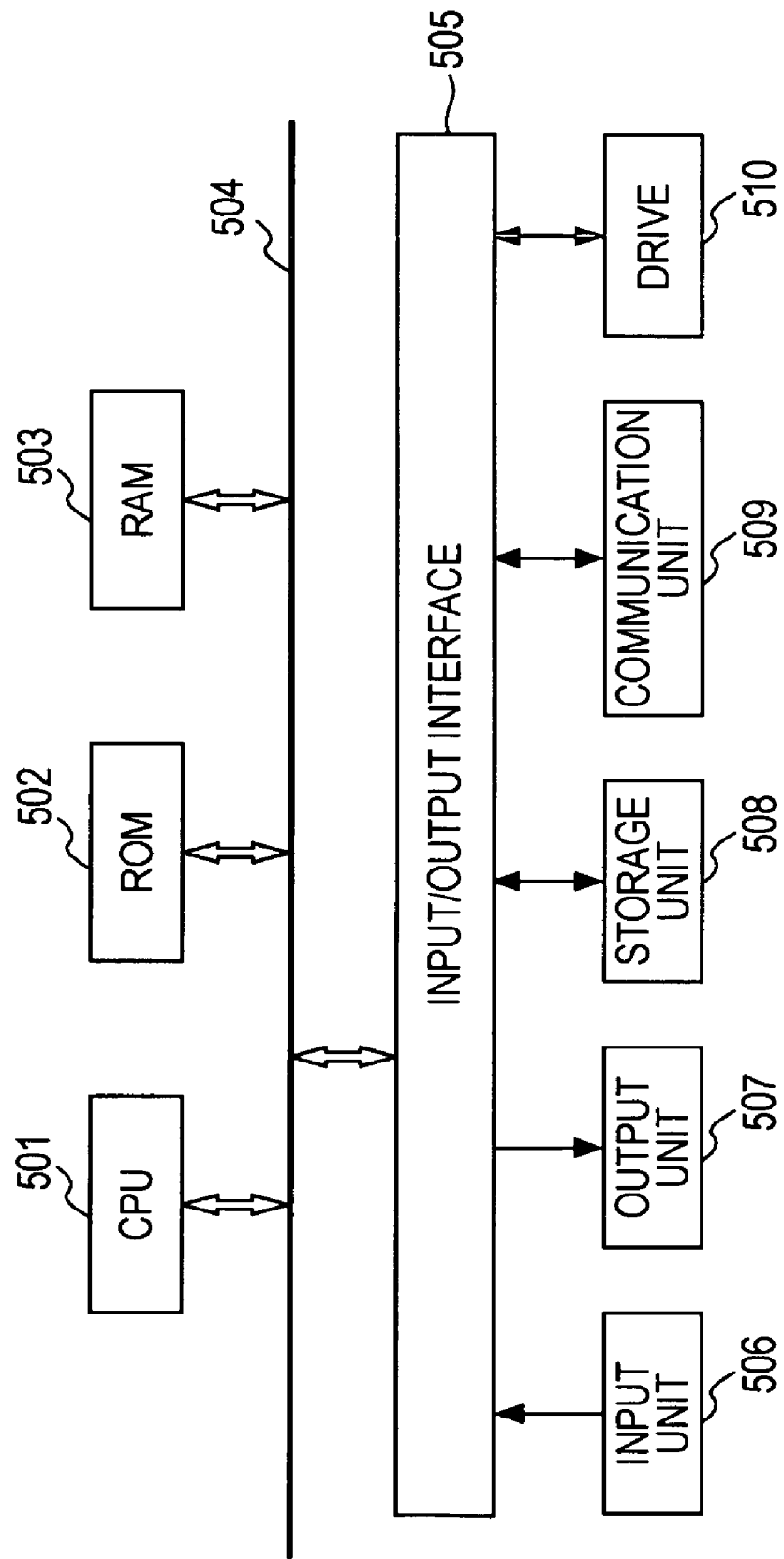

CONTENT DATA PROCESSING DEVICE, CONTENT DATA PROCESSING METHOD, PROGRAM, AND RECORDING/ PLAYING DEVICE

CROSS-REFERENCE TO RELATED APPLICATION

The present application claims priority from Japanese Patent Application No. JP 2008-223425 filed in the Japanese Patent Office on Sep. 1, 2008, the entire content of which is incorporated herein by reference.

BACKGROUND OF THE INVENTION

1. Field of the Invention

The present invention relates to a content data processing device, content data processing method, program, and recording/playing device. Particularly, the present invention relates a content data processing device and so forth that calculates a score as to degree of stability of image data for each frame, and selects a playing segment based on the score therein, whereby a stabilized image portion can be selected and for example selecting an image portion distorted by hand shaking or the like can be avoided.

2. Description of the Related Art

Hitherto, content data relating to television broadcast or content data obtained with a video camera and so forth has been accumulated in a recording/playing device such as a DVD recorder or HDD recorder and used widely.

With recording/playing devices according to the related art, in order to play recorded content in a short amount of time that has taken a long time to record, and to comprehend the content thereof, digest playing which only plays selected playing segments, has been proposed, for example, as described in Japanese Unexamined Patent Application Publication No. 2006-54619, Japanese Unexamined Patent Application Publication No. 2002-344872, and Japanese Unexamined Patent Application Publication No. 2000-261754.

SUMMARY OF THE INVENTION

With such digest playing, in the case of mechanically setting a playing segment to a constant time interval, e.g. 3 minutes, 5 minutes, 10 minutes or the like, an inconvenience may occur such as an image portion distorted by hand shaking or the like being selected as a playing segment.

It has been found to be desirable to enable playing segments in digest playing to be appropriately selected.

According to an embodiment of the present invention, a content data processing device includes: a stability score computing unit to compute a stability score corresponding to the stability of an image for each frame, based on the image data of each frame making up content data; and a playing segment selecting unit to select a playing segment from the content data based on the stability score computed with the stability score computing unit.

The stability score computing unit computes a stability score corresponding to the stability of the images of each frame of the content data. For example, as described below, a first stability score and second stability score are computed.

For example, a segment is detected which has an intra-frame difference that is smaller than a first threshold, the segment herein is set as a stable image segment in the event that the segment is longer than a predetermined segment length, and a first stability score is computed for the stable image segment based on an average value of the subtraction result obtained by subtracting the intra-frame difference from the first threshold. In this case, except for the stable image segment the first stability score is 0, and the smaller than the intra-frame difference is in the stable image segment the greater the stability score becomes.

Also for example, a second stability score is computed based on an average value of the subtraction result obtained by subtracting the intra-frame difference from a second threshold which is greater than the first threshold. In this case, the smaller the intra-frame difference is, the greater the second stability score becomes. By introducing the second stability score, a more stable scene can be selected from the above-described stable image segments as the playing segment.

At the playing segment selecting unit, a playing segment is selected from the content data based on the stability score computed by the stability score computing unit. Thus, the playing segment is selected based on the stability score, whereby a stable image portion can be selected as the playing segment, and selecting an image portion that is distorted by hand shaking or the like as a playing segment for example, is suppressed. For example, a the playing segment selecting unit, in the event that the total time of stable image segments in the content data is more than a total target playing time, all of the playing segments can be selected from the stable image segments.

The content data processing device may further include a simplicity score computing unit to compute a simplicity score corresponding to the simplicity of images of each frame, based on image data of each frame making up the content data; wherein the playing segment selecting unit selects the playing segments from the content data, based on the stability score computed by the stability score computing unit and the simplicity score computed by the simplicity score computing unit.

For example, a segment is detected wherein a dispersion of luminance values for each pixel included in a detection region set within a screen or a statistical processing value of standard deviation is smaller than a threshold, this segment is set as a simple image segment, and in this simple image segment, a first simplicity score is computed based on an average value of subtraction results obtained by subtracting the statistical processing value from the threshold. In this case, except for the simple image segment the first simplicity score is 0, and also, in the simple image segment the smaller the statistical processing value is and the simpler the image is, the greater the first simplicity score becomes.

Also, for example, for every predetermined period, in the case that the statistical processing value is greater than the threshold in the predetermined period, a second simplicity score is computed based on an average value of subtraction results obtained by subtracting the threshold from the statistical processing value. In this case, the greater the statistical processing value is, and the more complicated the image is, the greater the second simplicity score is.

A playing segment is selected from the content data by the playing segment selecting unit, based on the stability score computed by the stability score computing unit and the simplicity score computed by the simplicity score computing unit. Thus, the simplicity score is introduced in addition to the stability score and selection of playing segments is performed, whereby simple image segments that are photos of the ground or the sky or photos with the lens cap still on or the like can be avoided from being selected as playing segments.

Also, the content data processing device may further include an appearance score computing unit to determine similar images in each frame and compute an appearance score corresponding to at least the appearance frequency or appearance time for each similar image, based on image data of each frame making up the content data; wherein the playing segment selecting unit selects the playing segments from the content data, based on the stability score computed by the stability score computing unit, the simplicity score computed by the simplicity score computing unit, and the appearance score computed by the appearance score computing unit. Thus, by introducing a similarity score in addition to the stability score and simplicity score to perform selection of playing segments, segments having a greater appearance frequency or segments of images with longer appearance times are more likely to be selected as playing segments.

Note that in this case, when a predetermined playing segment is selected by the playing segment selecting unit, a predetermined value may be subtracted from the appearance score calculated by the appearance score computing unit corresponding to the image included in the predetermined playing segments. Thus, duplicate segments of similar images are prevented from being selected as playing segments.

Also, the content data processing device may further include a face detecting score computing unit to detect a face image included in images of each frame, and compute a face detecting score corresponding to at least the position, size, and number of faces of the face image, based on the image data of each frame making up the content data; wherein the playing segment selecting unit selects the playing segment from the content data, based on the stability score computed by the stability score computing unit, the simplicity score computed by the simplicity score computing unit, and a face detecting score computed by the face detecting score computing unit. Thus, by introducing a face detecting score in addition to the stability score and simplicity score to perform selection of playing segments, segments of images where a face exists are more likely to be selected as playing segments.

Also, the content data processing device may further include an audio score computing unit to detect audio features of each frame, and compute an audio score corresponding to the audio features, based on audio data corresponding to the image data of each frame making up the content data; wherein the playing segment selecting unit selects the playing segment from the content data, based on the stability score computed by the stability score computing unit, the simplicity score computed by the simplicity score computing unit, and an audio score computed by the audio score computing unit. Thus, by introducing an audio score in addition to the stability score and simplicity score to perform selection of playing segments, for example segments of images having a higher audio level are more likely to be selected as playing segments.

Also, the content data processing device may further include a camera motion detecting unit to detect camera motion associated with each frame of the image data making up the content data; and a score adjusting unit to adjust in the direction that the stability score computed with the stability score computing unit increases in the event that identified camera motion is detected by the camera motion detecting unit. Imaged images that are taken with camera motions such as zooming, panning, and tilting, are often important scenes. In this case, the image is moving so the stability score decreases.

However, as described above, the stability score is adjusted in the direction of increasing, whereby segments of the images taken with camera motions such as zooming, panning, and tilting are suppressed from being excluded as playing segments.

According to the above configurations, a score is computed corresponding to the stability of the image data for each frame, whereby playing segments are selected based on the score herein, an image portion that is distorted by hand shaking or the like can be avoided from being selected as a playing segment, and playing segments can be appropriately selected.

BRIEF DESCRIPTION OF THE DRAWINGS

FIG. 15 is a diagram illustrating an example of a first degree of stability score Ssi and a second degree of stability score Sspm that are calculated with the stable image detecting unit;

FIG. 16 is a diagram illustrating an example of a first simplicity degree score Sbi and a second simplicity degree score Sbp that are calculated with the simple image detecting unit;

FIG. 21 is a diagram illustrating an internal configuration of a computer executing processing for the function units of the content data processing unit.

DESCRIPTION OF THE PREFERRED EMBODIMENTS

Preferred embodiments of the present invention (hereafter called "embodiments") will be described below.

Configuration of Recording/Playing Device

Figure 1:
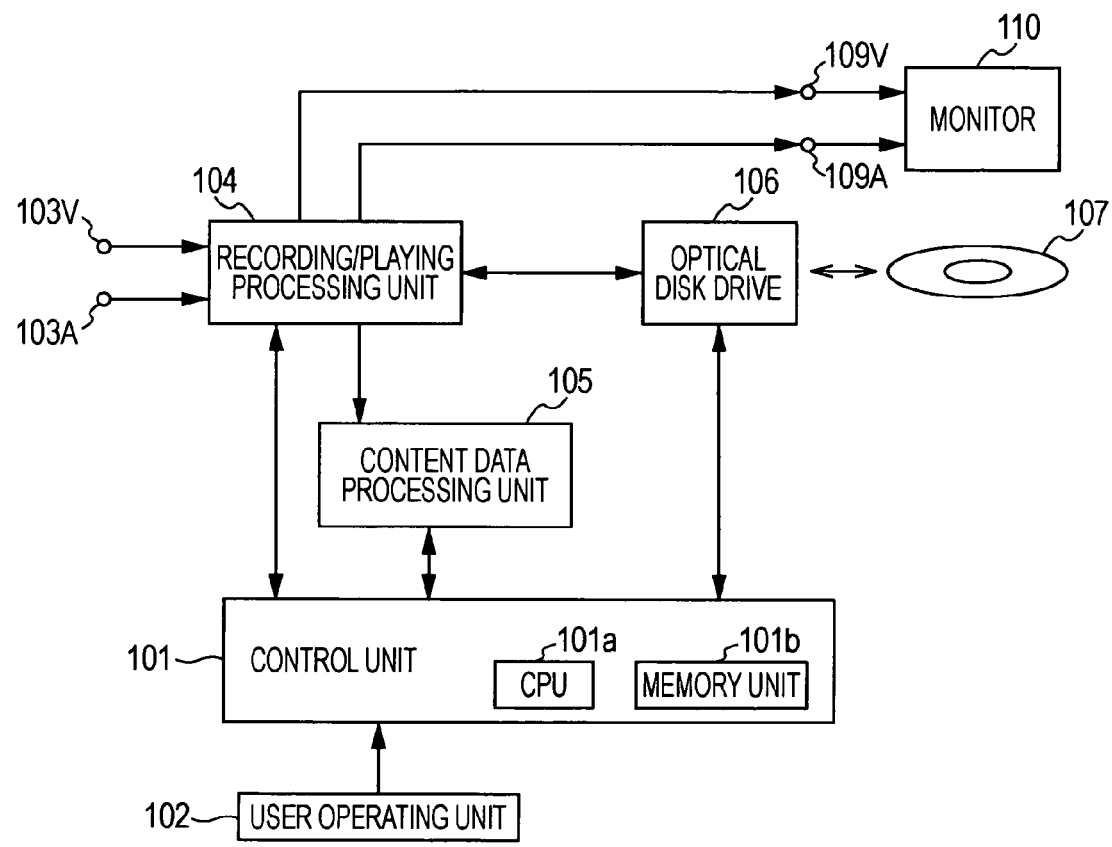
FIG. 1 is a block diagram illustrating a configuration example of a recording/playing device according to an embodiment of the present invention.

FIG. 1 shows a configuration example of a recording/playing device 100 serving as an embodiment. The recording/playing device 100 has a control unit 101, user operating unit 102, image data input terminal 103V, audio data input terminal 103A, recording/playing processing unit 104, content data processing unit 105, optical disk drive 106, DVD 107 serving as a recording medium, image data output terminal 109V, audio data output terminal 109A, and monitor 110.

The control unit 101 controls the operations for the various components of the recording/playing device 100. The control unit 101 has a CPU 101a and memory unit 101b. The memory unit 101b has flash ROM, SDRAM, and the like. The flash ROM stores a control program and the like of the CPU 101a. The SDRAM is used for temporary storage for data for the control processing of the CPU 101a. The CPU 101a expands a program and data read from the flash ROM onto the SDRAM and starts the program, and controls the operations of the components of the recording/playing device 100.

The user operating unit 102 makes up a user interface, and is connected to the control unit 101. The user can perform various types of operations relating to recording/playing with the user operating unit 102. The user operating unit 102 is made up of keys, buttons, and dials disposed on an unshown casing face of the recording/playing device 100 or with a remote-controlled transmission/receiving device or the like.

The recording/playing processing unit 104 performs recording processing such as compression encoding or the like according to the recording format as to image data and audio data making up the content data which is input into the input terminals 103V and 103A at the time of recording, to generate recording data, and supplies this to an optical disk drive 106.

For example, the recording/playing processing unit 104 subjects the image data to encoding processing with an MPEG (Moving Picture Expert Group) method, and generates a video Elementary Stream (ES), while subjecting the audio data to encoding processing with an MPEG method, and generating an audio elementary stream. The recording/playing processing unit 104 subjects the video and audio elementary streams and various types of control signals to multiplexing, and generates a Transport Stream (TS) serving as the recording data.

Also, at the time of playing, the recording/playing processing unit 104 performs decoding processing or the like as to the data played with the optical disk drive 106, and generates image data and audio data making up the content data. For example, the recording/playing processing unit 104 separates the video and audio elementary streams from the playing data, subjects each thereof to decoding processing with an MPEG (Moving Picture Expert Group) method, outputs playing image data to the image data output terminal 109V, and outputs playing audio data to the audio data output terminal 109A.

Also, the content data processing unit 105 processes the content data to be recorded or that has been played, selects a playing segment (scene) for digest playing, and creates a playlist. The playlist is point-in-time information indicating the starting position and ending position for each playing segment selected from the content data (point-in-time information associated with a time code appended to the image data and recorded).

Also, the content data processing unit 105 processes the content data to be recorded or that has been played, selects image data frames making up thumbnails of the content data, and creates a thumbnail list. Now, the thumbnail list is point-in-time information of the frames making of the thumbnails selected from the content data (point-in-time information associated with a time code appended to the image data and recorded).

The creating processing of the playlist and thumbnail list by the content data processing unit 105 described above is performed, for example, by a user operating a user operating unit 102 or is automatically performed. The playlist and thumbnail list created by the content data processing unit 105 are held in the memory unit 101b within the control unit 101. The details of the content data processing unit 105 will be described later.

The optical disk drive 106 performs recording/playing as to a DVD 107 serving as a recording medium. That is to say, when recording, the optical disk drive 106 records the recording data generated by the recording/playing processing unit 104 on the DVD 107. Also, at the time of playing, the optical disk drive 106 plays data from the DVD 107 and supplies this to the recording/playing processing unit 104.

Operation of Recording/Playing Device

The operations of the recording/playing device 100 shown in FIG. 1 will be described. First, operations at the time of recording will be described. Image data and audio data making up the content data that is input in the input terminals 103V and 103A is supplied to the recording/playing processing unit 104. With the recording/playing processing unit 104, recording processing such as compression encoding or the like according to the recording format is performed as to the image data and audio data that is input in the input terminals 103V and 103A, and recording data is generated. The recording data thus generated by the recording/playing processing unit 104 is recorded on the DVD 107 by the optical disk drive 106.

Next, the operations at the time of playing (including at the time of digest playing) will be described. Data is played from the DVD 107 with the optical disk drive 106, and the playing data therein is supplied to the recording/playing processing unit 104. At the recording/playing processing unit 104, the playing data is subjected to decoding processing or the like, whereby image data and audio data is generated.

The image data and audio data generated by the recording/playing processing unit 104 is output to the output terminals 109V and 109A. Therefore, the image data and audio data is supplied to the monitor 110 connected to the output terminals 109V and 109A, whereby the playing image is displayed and playing audio is output.

Next, operations at the time of creating a playlist and thumbnail list will be described. As described above, the list creating processing is performed at the time of recording or after the recording, by user instructions or automatically. In the case that list creating processing is performed at the time of recording, the image data and audio data input in the input terminals 103V and 103A is supplied to the content data processing unit 105 through the recording/playing processing unit 104, as image data and audio data making up the content data subject to list creation. On the other hand, in the case that list creating processing is performed after recording, the image data and audio data making up the content data subject to list creating, which is played after recording and obtained with the recording/playing processing unit 104, is supplied to the content data processing unit 105.

The image data, or the image data and audio data, is processing at the content data processing unit 105, playing segments for digest playing is selected, and a playlist is created. Also, the image data, or the image data and audio data, is processed at the content data processing unit 105, image data frames making up the thumbnail of the content data are selected, and a thumbnail list is created.

The playlist and thumbnail list thus created with the content data processing unit 105 are held in the memory unit 101b within the control unit 101. The playlist held in the memory unit 101b is used as playing position information at the time of digest playing. Also, the thumbnail list held in the memory 101b is used to obtain frame image data in the event of displaying the thumbnail of the content data.

Configuration of Content Data Processing Unit

Figure 2:
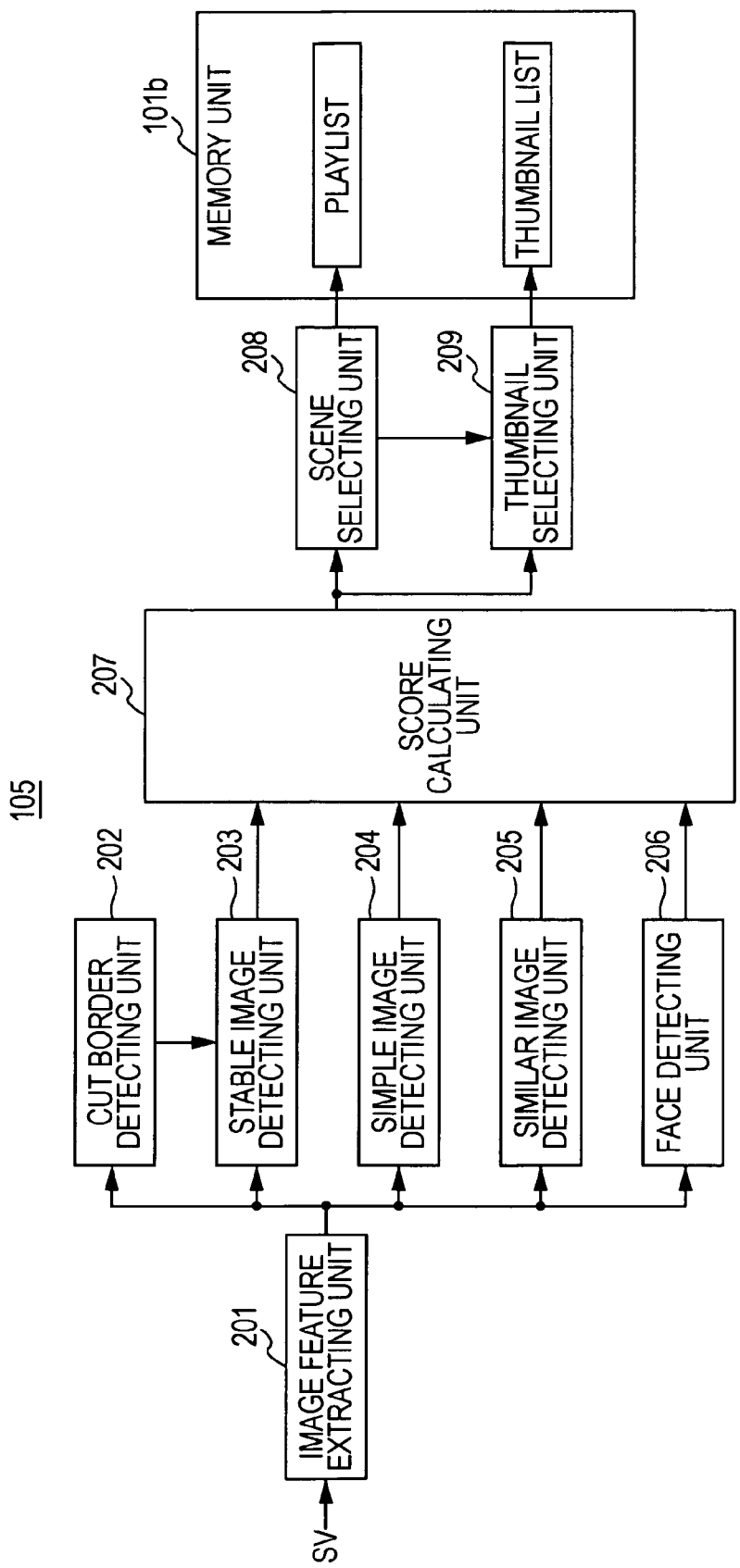
FIG. 2 is a block diagram illustrating a configuration example of a content data processing unit.

Next, the content data processing unit 105 will be described. FIG. 2 shows a configuration example of the content data processing unit 105. The content data processing unit 105 shows an example of processing only the image data to create the playlist and thumbnail list.

In FIG. 2 the content data processing unit 105 has an image feature extracting unit 201, cut border detecting unit 202, stable image detecting unit 203, simple image detecting unit 204, similar image detecting unit 205, and face detecting unit 206. Also, the content data processing unit 105 has a score calculating unit 207, scene selecting unit 208, and thumbnail selecting unit 209.

Image data SV making up the content data subject to list creation is input in the image feature extracting unit 201. The image feature extracting unit 201 processes the image data SV and generates various types of feature information used for processing the various detecting units. That is to say, the image feature extracting unit 201 computes an intra-frame difference d(t) for each frame of the image data SV, for the processing of the cut border detecting unit 202. Also, for the processing of the stable image detecting unit 203, the image feature extracting unit 201 computes an intra-frame difference d'(t) wherein a median filter is applied to the intra-frame difference d(t) and peaks and noise in pulse form are removed.

Also, the image feature extracting unit 201 computes a dispersion V(t) which is a statistical processing value for each frame of the image data SV, for the processing of the simple image detecting unit 204. Note that standard deviation may be used instead of dispersion V(t). Also, for the processing of the similar image detecting unit 205, the image feature extracting unit 201 distinguishes similarities between images of each frame, and appends the same ID (identifier) for each frame having similar images. Note that in the case that the same ID as described above is already appended to each frame of the image data SV input in the image feature extracting unit 201, the processing to append the ID with the image feature extracting unit 201 can be omitted.

Also, for the processing of the face detecting unit 206, the image feature extracting unit 201 detects a face image for each frame of the image data SV, and obtains position information, size information, and number of faces information of the face image. Note that the detecting processing of the face image does not have to be performed for every frame, and according to the processing capability, the detecting processing can be performed for every predetermined interval of frames, and the information representing the interval may be obtained.

Intra-Frame Difference d(t), d'(t)

Figure 3:
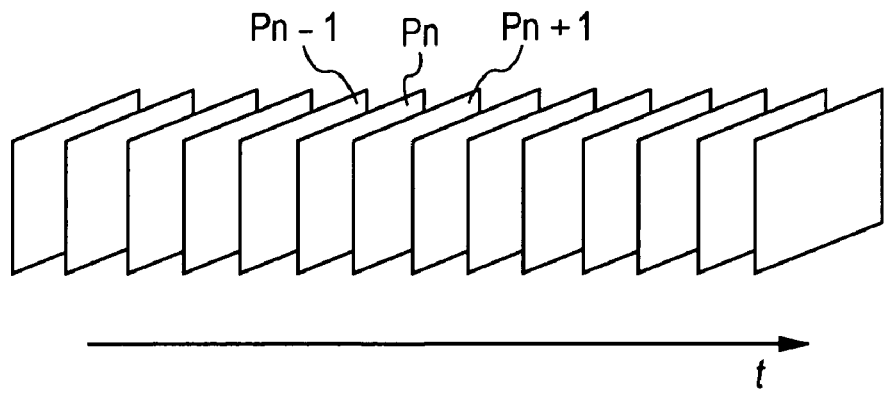
FIG. 3 is a diagram illustrating that image P in frames arrayed in a time-series manner, and is a diagram to describe the calculating processing of intra-frame difference d(t) and d'(t)
Figure 4:
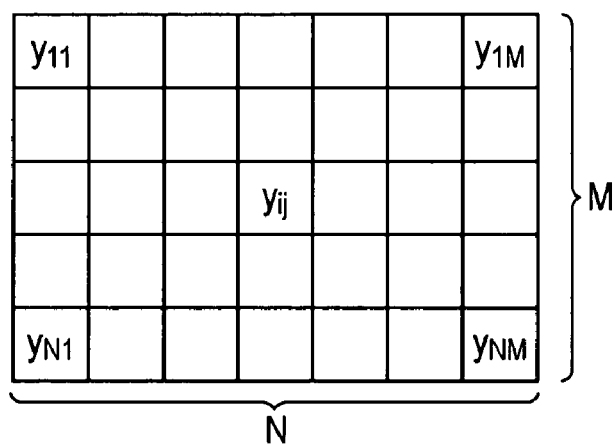
FIG. 4 is a diagram illustrating that an image in frames divided into N in the horizontal direction, divided into M in the vertical direction, and divided into N×M blocks, and is a diagram to describe the calculating processing of intra-frame difference d(t) and d'(t)

The computing processing of the intra-frame difference d(t), d'(t) will be described. FIG. 3 shows that the image P for each frame is arrayed in a time-series manner. In order to compute the intra-frame difference d(t), the image of the target frame (point-in-time t) and the image that is one frame before the target frame are divided into N in the horizontal direction and divided into M in the vertical direction, so as to be divided into N×M blocks, as shown in FIG. 4. The intra-frame difference d(t) is obtained from Expression (1), using the luminance average value of the pixels included in each block as yij. In Expression (1), yij(t) is the luminance average value of the image of the target frame, and yij(t−1) is the luminance average value of the image of one frame prior.

$$d(t) = \sum_i \sum_j |y_{ij}(t) - y_{ij}(t-1)| \quad (1)$$

Also, as shown in Expression (2), filter computation for a median filter is performed as to the intra-frame difference d(t), whereby the intra-frame difference d'(t) is obtained. In Expression (2), the median(d(t)) means that the center value in the sample values included in t±Δt is output as to point-in-time t.

$$d'(t) = \text{median}(d(t)) \quad (2)$$

Dispersion V(t)

Figure 5:
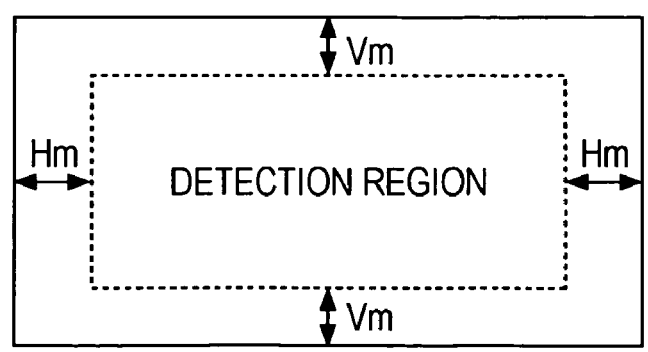
FIG. 5 is a diagram to describe that dispersion V(t) can be obtained based on a luminance value of N pixels i included in a detecting region.

The computation processing of the dispersion V(t) will be described. As shown in FIG. 5, in the image of each frame, a region surrounded with a broken line which excludes the periphery portion (Hm, Vm) is set as a detection region. The dispersion of the luminance value of N pixels i included in the detection region is obtained by Expression (3) as the dispersion V(t) of the image of the target frame (point-in-time) t. In Expression (3), yi(t) is the luminance value of pixel i, and y(t) bar is the luminance average value of the N pixels i.

$$V(t) = \frac{1}{N} \sum_{i=1}^{N} (y_i(t) - \bar{y}(t))^2 \quad (3)$$

Appending Ids

Figure 6:
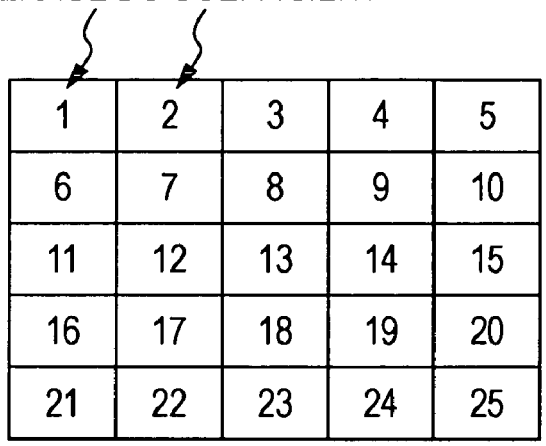
FIG. 6 is a diagram to describe that a feature vector of an image of each frame has an average DC coefficient of the DCT of multiple division screen regions as a vector element.

For the image of each frame, the image is divided into multiples, e.g. as shown in FIG. 6 is divided into 25 parts, an average DC coefficient of the DCT of the region corresponding to each divided screen region is computed, and a feature vector is generated wherein the computed multiple average DC coefficients are vector elements. For the image of each frame, the intra-vector distance between the feature vector of another frame image of the above-described feature vector, i.e. the total of the difference absolute values for each corresponding vector element is obtained, and similarity determination between other frame images is performed. Note that the vector elements of the feature vector is not limited to the above average DC coefficient for each divided screen region, but for example an average luminance value for each divided screen region, and further, an average color difference signal value or the like may be used.

The same ID (identifier) is appended to each frame wherein the images are similar. For example, let us say that the initial value of the ID is 1, and each frame is a target frame for sequential ID appending processing. The ID=1 is appended to the first target frame. Regarding the next target frame and thereafter, in the case that the intra-vector distance between the images of another predetermined frame already processed is at or less than a threshold value, the same ID as the ID appended in the other predetermined frame is appended. Also, regarding the next target frame and thereafter, in the case that the intra-vector distance between the images of all of the other predetermined frames already processed is greater than the threshold value, an ID that has 1 added to the maximum value of the ID already appended is appended.

Figure 7:
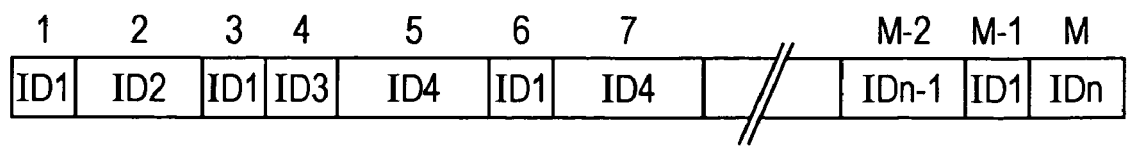
FIG. 7 is a diagram illustrating an example of a state after ID-appending as to a series of content data.

FIG. 7 shows an example of a state after appending the IDs to a series of content data. In the case of the example herein, n IDs are appended, from ID 1 to ID n, overall. In other words, the content data herein is made up of n similar segments.

Face Image Detecting

The face detecting unit of the image feature extracting unit 201 performs the face image detecting processing described below as to the image of each frame, and obtains position information, size information, and number of faces information of the face image.

Figure 8:
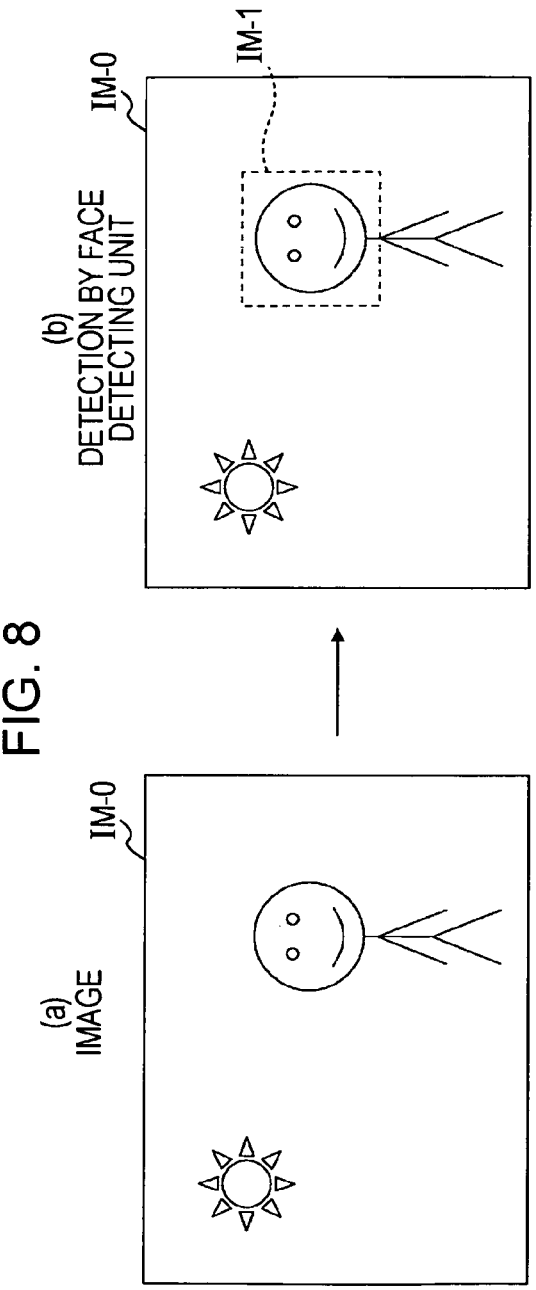
FIG. 8 is a diagram to describe detecting operation of a face image with a face detecting unit.

When the image IM-0 is as shown in (a) in FIG. 8, the face detecting unit detects a face image IM-1 included in the imaged image IM-0, as shown surrounded by a broken line frame in (b) in FIG. 8.

Figure 9:
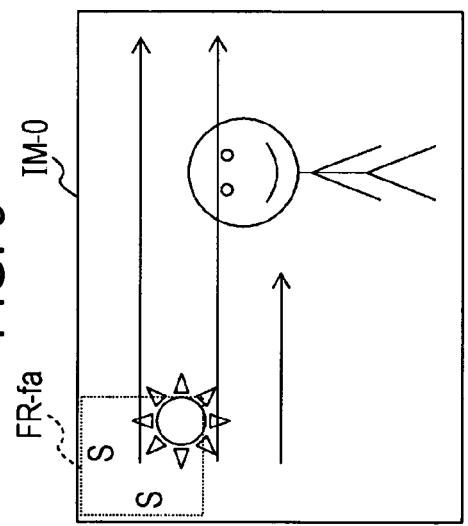
FIG. 9 is a diagram to describe a detecting frame FR-fa set on an imaged image IM-0 for face image detection.

In the detecting processing of the face image, as shown in FIG. 9, a detecting frame FR-fa of a predetermined size, e.g. the horizontal size is S pixels and the vertical size is S pixels, is set on the imaged image IM-0. S pixels are, for example, 80 pixels or greater. The detecting frame FR-fa scans the imaged image IM-0, as shown by the arrows in FIG. 9, whereby the position thereof is sequentially changed. The face score SCORE_fa is measured using the face dictionary, and based on the face score SCORE_fa, determination is made as to the image surrounded by the detecting frame FR-fa at each position as to whether the image is a face image.

Figure 10:
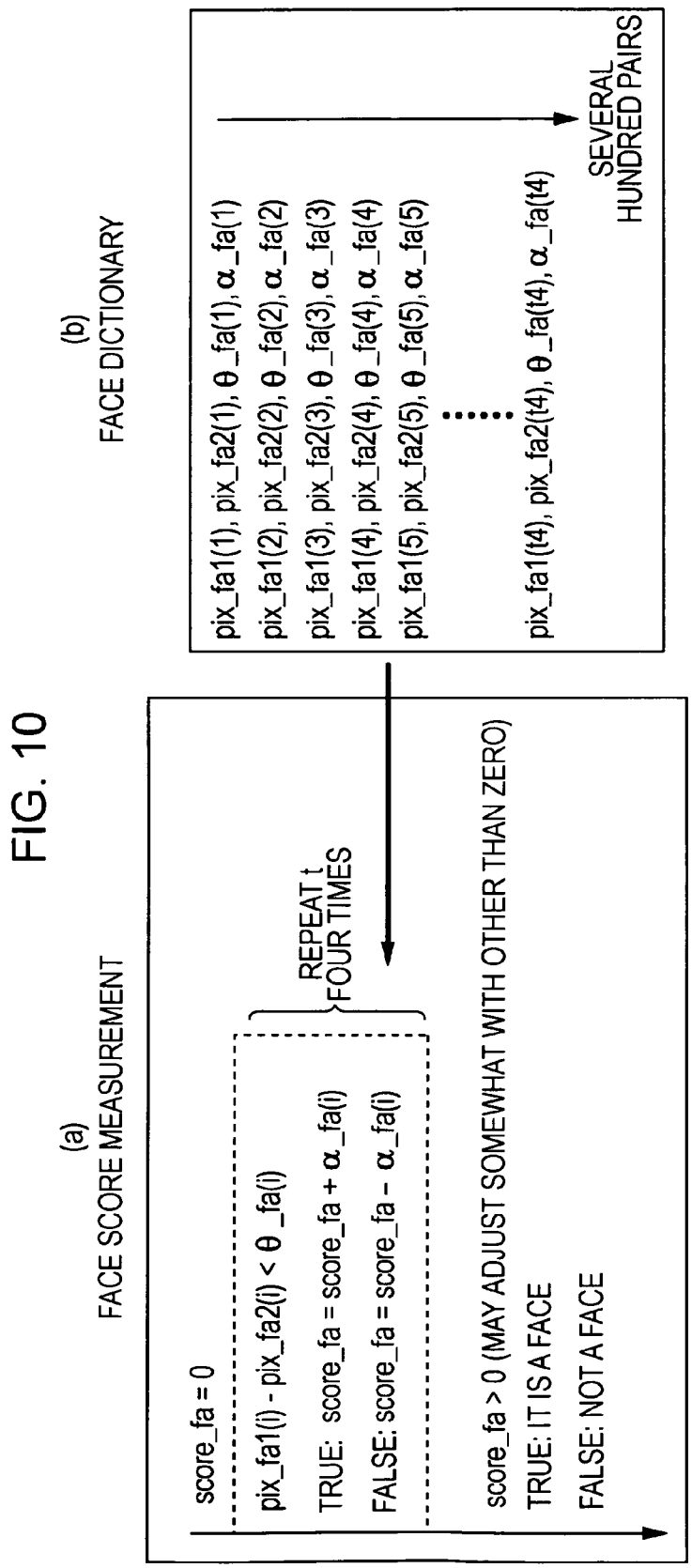
FIG. 10 is a diagram to describe a face dictionary used at the time of face image detecting, and measurement of a face score SCORE_fa using the face dictionary herein.
Figure 11:
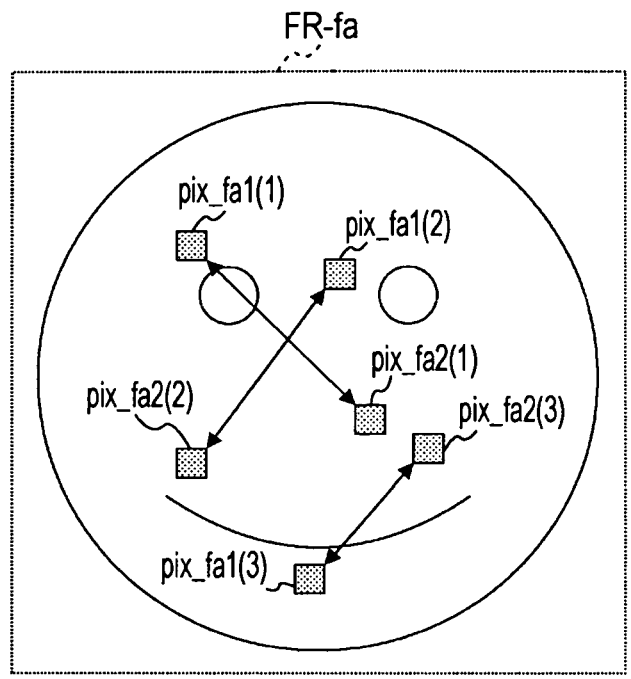
FIG. 11 is a diagram to describe the relation between position information for each combination of the face dictionary and the detecting frame FR-fa.
Figure 12:
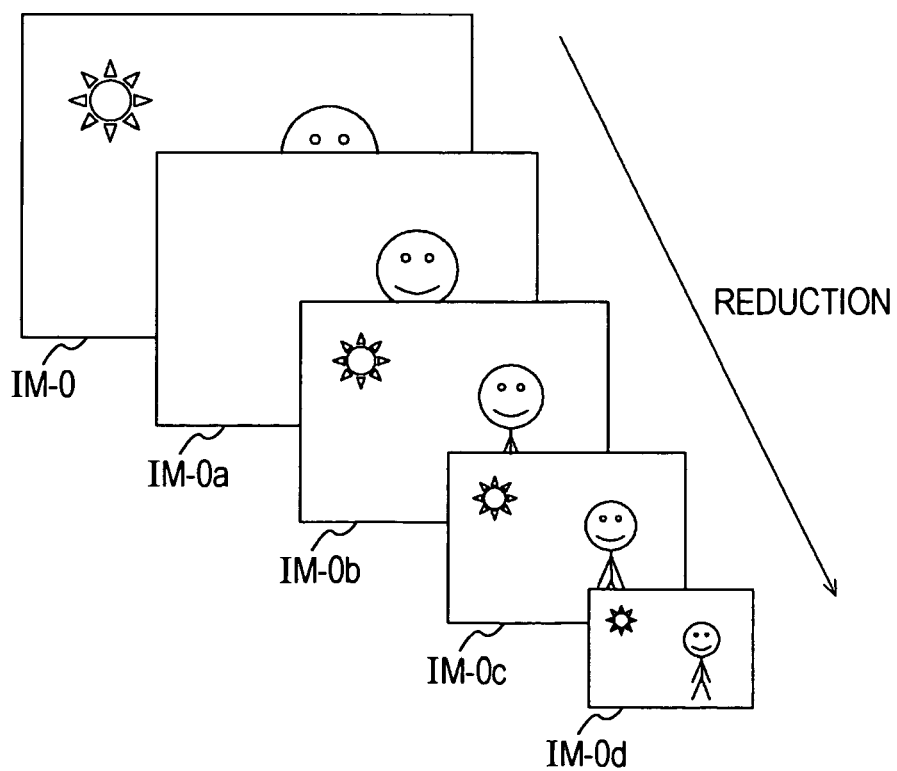
FIG. 12 a diagram illustrating the imaged image IM-0 used at the time of face image detecting, and the reduced images thereof IM-0$a$, IM-0$b$, and so forth.

The face dictionary is made up of combinations of t4 pairs (several hundred pairs) of pix_fa1($i$), pix_fa2($i$), $\theta$_fa(i), and $\alpha$_fa(i), as shown in (b) in FIG. 10. Now, pix_fa1($i$) and pix_fa2($i$) show positions of two points in the image surrounded with the detecting frame FR-fa, as shown in FIG. 11. Note that in FIG. 11, in order to simplify the screen, only three pairs are shown. $\theta$_fa(i) represents a threshold value relating to the difference in luminance value of the pix_fa1($i$) and the luminance value of the pix_fa2($i$). Also, $\alpha$_fa(i) represents the weighting that is added or subtracted based on comparison results of the difference between the pix_fa1($i$) luminance value and pix_fa2($i$) luminance value, and the threshold value $\theta$_fa(i). The detailed description of the values for each of pix_fa1($i$), pix_fa2($i$), $\theta$_fa(i), and $\alpha$_a(i) is omitted, but these are obtained by learning with a mechanical learning algorithm such as AdaBoost or the like.

Measurement of the face score SCORE_fa determines whether or not Expression (4) is satisfied, corresponding to each pair of pix_fa1($i$), pix_fa2($i$), $\theta$_fa(i), and $\alpha$_fa(i) of the face dictionary, as shown in (a) in FIG. 10, and in the case of satisfying, the computation in Expression (5) is performed, and on the other hand in the case of not satisfying, the computation in Expression (6) is performed, whereby measurement of the face score SCORE_fa is performed. Note that in Expression (4), pix_fa1($i$) indicates the luminance value of the position thereof, and pix_fa2($i$) indicates the luminance value of the position thereof.

$$pix\_fa1(i) - pix\_fa2(i) < \theta\_fa(i) \quad (4)$$

$$SCORE\_fa = SCORE\_fa + \alpha\_fa(i) \quad (5)$$

$$SCORE\_fa = SCORE\_fa - \alpha\_fa(i) \quad (6)$$

Determining whether or not the image surrounded by the detecting frame FR-fa is a face image is performed based on the face score SCORE_fa measured as described above. Note that in the face score SCORE_fa measurement, in the case of satisfying Expression (4), then h(i)=1, and conversely in the case of not satisfying Expression (4), then h(i)=−1, whereby the measured face score SCORE_fa is expressed in Expression (7).

$$SCORE\_fa = \sum_i h(i) \alpha\_fa(i) \quad (7)$$

In the case that the face score SCORE_fa is greater than 0, the image surrounded by the detecting frame FR-fa is determined to be a face image. On the other hand, in the case that the face score SCORE_fa is 0 or less, the image surrounded by the detecting frame FR-fa is determined to not be a face image. Note that the determining standard may be a value somewhat adjusted other than zero, instead of a determining standard of 0.

Note that there may be various sizes of face images included in the imaged image. Therefore, as shown in FIG. 9, in the case of setting the detecting frame FR-fa of a predetermined size on the imaged image IM-0 to detect the face image, only the face image corresponding to the size of the detecting frame FR-fa within the face image included in the imaged image IM-0 can be detected. Thus, in order to enable detecting of various types of face imaged included in the imaged image IM-0, the detecting processing of the face image described above is also performed as to not only imaged image IM-0 but also as to reduced images IM-0$a$, IM-0$b$, and so forth wherein the imaged image IM-0 has been appropriately reduced. Thus, the face image size detected from the imaged image IM-0 becomes one of multiple sizes that are set hierarchically.

Figure 13:
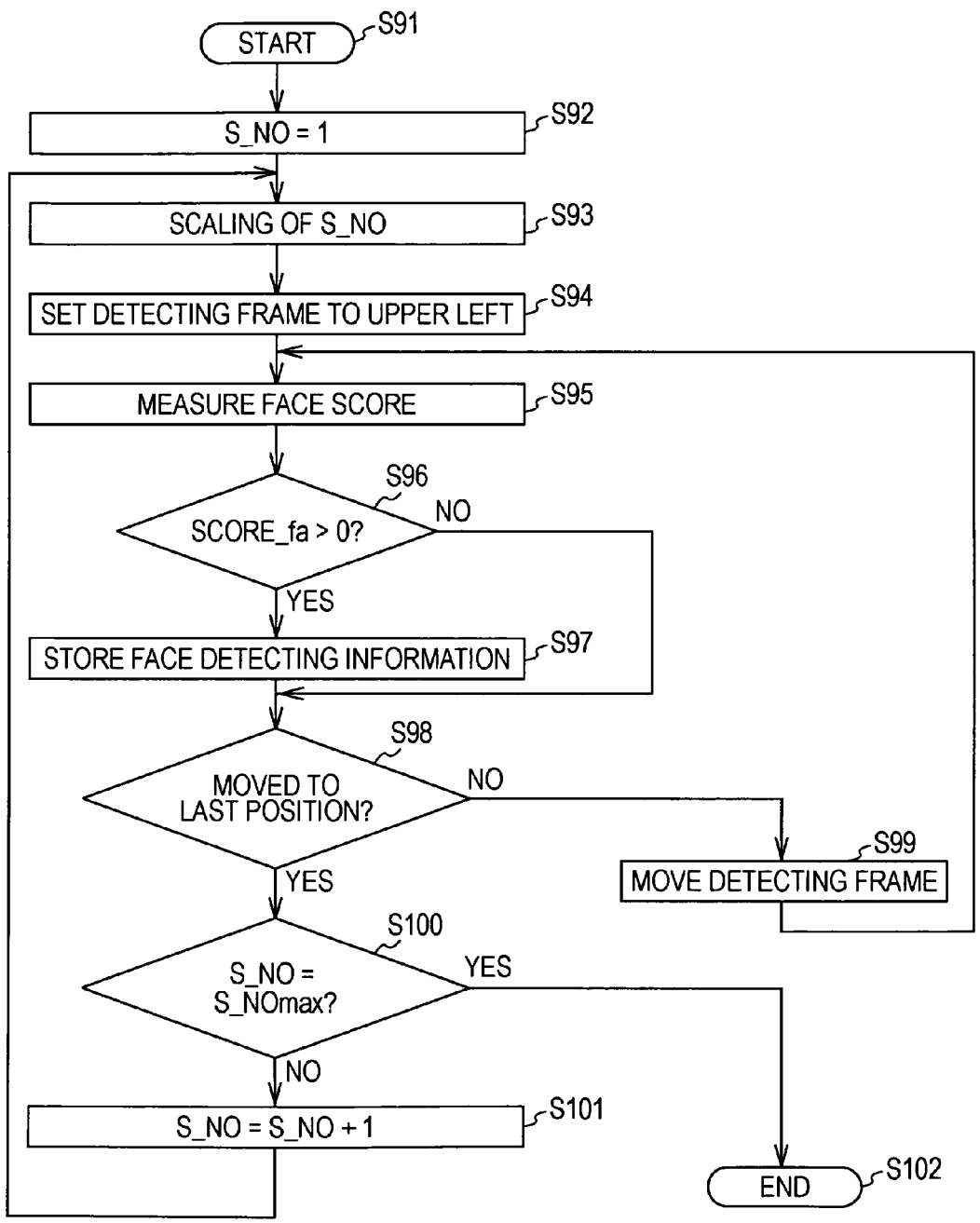
FIG. 13 is a flowchart describing procedures for the face image detecting processing with the face detecting unit.

The flowchart in FIG. 13 shows an example of procedures of the face image detecting processing with the face detecting unit.

First, the face detecting unit starts face image detecting processing in step S91, and thereafter advances to step S92. In step S 92, the face detecting unit sets a reduction level S_NO of the imaged image IM-0 to 1. In step S93, the face detecting unit then obtains the image information of the image IM-0, performs scaling (reduction processing) of the reduction level S_NO, and generates a reduced image (reduced imaged image) to detect the face image.

Note that when S_NO=1, the reduction rate is 1, and the reduced image to detect the face image is the same as the imaged image IM-0. Also, as the reduction level S_NO becomes greater, the reduction rate becomes smaller. A face image detected in a reduced image having a smaller reduction rate is a greater face image on the imaged image IM-0. The size information and position information included in the face detecting information is in the imaged image IM-0.

Next, in step S94, the face detecting unit sets the detecting frame FR-fa on the upper left of the reduced image generated in step S93. In step S95, the face detecting unit then uses the face dictionary to measure the face score SCORE_fa, as described above.

Next, in step S96, the face detecting unit determines whether or not the image surrounded by the detecting frame FR-fa is a face image, based on the face score SCORE_fa measured in step S95. In this case, the face detecting unit determines that the image is a face image when SCORE_fa>0 holds, and determines that the image is not a face image when SCORE_fa>0 does not hold.

In the case of determining that the image is a face image, the face detecting unit advances the flow to step S97. In step S97, the face detecting unit stores information (position information, size information) of the image surrounded with a detecting frame FR-fa as a face image to an unshown storage device unit. Following the processing in step S97, the face detecting unit advances the flow to step S98. In the case of determining in step S96 that the image is not a face image, the face detecting unit immediately advances the flow to step S98.

In step S98, the face detecting unit determines whether or not the detecting frame FR-fa has moved to the final position. In the case that the detecting frame FR-fa has not moved to the final position, in step S99 the face detecting unit moves the detecting frame FR-fa to the next position, then returns to step S95, and repeats the processing similar to that described above. Note that the detecting frame FR-fa is moved in the horizontal direction one pixel at a time at a certain vertical position, and upon movement in the horizontal direction at the vertical position ending, the frame is moved in the vertical position by one pixel, then moves to the next vertical position.

In the case that the detecting frame FR-fa is moved to the last position in step S98, in step S100 the face detecting unit determines whether or not the reduction level S_No is at the last level S_NOmax. If not at S_NO=S_NOmax, the face detecting unit changes the reduction level S_NO to the next level in step S101, and subsequently moves to step S93 and repeats the processing similar to that described above.

Also, in the case that S_NO=S_NOmax in step S100, this means that detecting processing for the face images at all of the reduction level S_NO has ended, so in step S102 the face detecting unit ends the face image detecting processing.

Returning to FIG. 2, the cut border detecting unit 202 sets each frame of the image data SV to be a cut border detecting frame, in sequence, and detects a cut border, i.e. a frame making up the cut border. The cut border detecting unit 202 uses the intra-frame difference d(t) computed with the image feature extracting unit 201 for example to detect the frames making up the cut border.

That is to say, the cut border detecting unit 202 compares the intra-frame difference d(t) and the threshold value Dtc for cut border detecting, and detects the frame that is d(t)>Dtc as the frame making up the cut border. The intra-frame difference d(t) of the frame making up the cut border appears as a pulse-form peak PP. Therefore, the threshold value Dtc is set beforehand as a value that can detect a pulse-form peak PP. The cut border detecting unit 202 supplies the information of the frame making up the detected cut border to the stable image detecting unit 203.

Figure 14:
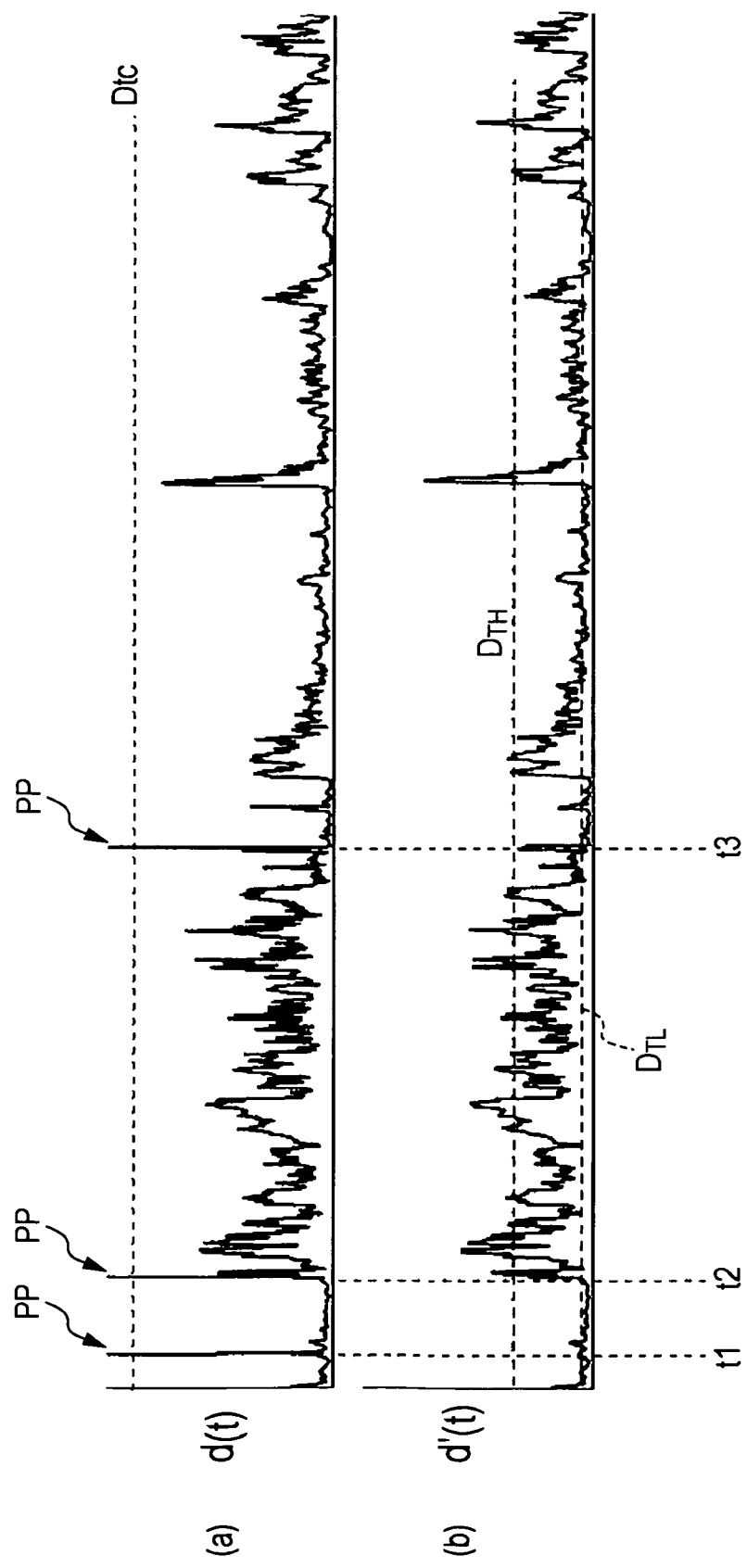
FIG. 14 is a diagram illustrating an example of the intra-frame difference d(t), d'(t) between the frames of the image data SV obtained by calculation with an image feature extracting unit.

In FIG. 14, (a) shows an example of the intra-frame difference d(t) in each frame of the image data SV that is computed and obtained with the image feature extracting unit 201. In the example in (a) in FIG. 14, the intra-frame difference d(t) becomes a pulse-form peak PP in the frames at points-in-time t1, t2, t3, whereby d(t)>Dtc is satisfied, and the relevant frame is detected as a frame making up a cut border.

Note that the detecting method of the cut border of the cut border detecting unit 202 is not limited to the method described above, and may be another method. For example, there is a method for the cut border detecting unit 202 to compare the feature vector of the target frame and the feature vector of the frame positioned before or after the target frame, and determine whether or not the target frame is a frame making up the cut border.

In this case, the intra-vector distance between the feature vector of the target frame and the feature vector of the frame positioned before or after the target frame is obtained. In the case that the intra-vector distance is greater than a preset threshold value, the target frame is detected as a frame making up the cut border.

Note that the feature vector for each frame is generated as described below, for example, similar to the description in the above-described "Appending ID" section. That is to say, the image is divided into multiple parts, e.g. as shown in FIG. 6 divided into 25 parts, and an average DC coefficient of the DCT of the region corresponding to each divided screen region is computed. The computed multiple average DC coefficients are vector elements, whereby a feature vector is obtained.

The stable image detecting unit 203 computes a stability score corresponding to the stability of the image of each frame. The stable image detecting unit 203 computes a first stability score Ssi and second stability score Ssp. The stable image detecting unit 203 makes up a stability score computing unit.

First Stability Score Ssi

A computing method for the first stability score Ssi will be described. The stable image detecting unit 203 detects a stable image segment using a threshold value DTL, based on the intra-frame difference d'(t) computed by the image feature extracting unit 201. In FIG. 14, (b) shows an intra-frame difference d'(t) after filtering by a median filter, corresponding to the intra-frame difference d'(t) shown in (a) in FIG. 14. The threshold value DTL is set at a low level value, as shown in the diagram.

Note that with the stable image detecting unit 203, in addition to the threshold value DTL herein, a threshold value DTH for computing a second stability score Ssp is used. The threshold value DTH is greater than the threshold value DTL, and is set at a high level value, as shown in the diagram.

The stable image detecting unit 203 detects a segment wherein the intra-frame difference d'(t) is smaller than the threshold value DTL. In this case, in the event that a cut border that is detected by the cut border detecting unit 202 is included in the detected segment, the stable image detecting unit 203 divides the segment with the cut border. In the event that the detected segment is longer than a constant segment length Ta, the stable image detecting unit 203 sets the segment herein as a stable image segment.

In a stable image segment, the stable image detecting unit 203 computes a first stability score Ssi, based on the average value of the subtraction results obtained by subtracting the intra-frame difference d'(t) from the threshold value DTL. That is to say, the stable image detecting unit 203 computes the first stability score Ssi with Expression (8). In Expression (8), Ts indicates the starting point-in-time of the stable image segment, and Te indicates the ending point-in-time of the stable image segment. Also, in Expression (8), the DTL in the denominator is provided to perform normalizing so that Ssi=1 when d'(t)=0.

$$S_{si} = \frac{\sum_{t=T_s}^{T_e} (D_{TL} - d'(t))}{(T_e - T_s)D_{TL}} \quad (8)$$

When the intra-frame difference d'(t) is shown as in (a) in FIG. 15 (the same as in (b) in FIG. 14), the stable image segment is detected as shown in the diagram, and the first stability score Ssi is computed as shown in (b) in FIG. 15. In this case, the first stability score Ssi is 0 except for the stable image segment, and also, with the stable image segment the smaller the intra-frame difference d'(t) is the greater the stability score Ssi is.

Second Stability Score Ssp

A computing method for the second stability score Ssp will be described. The stable image detecting unit 203 calculates a second stability score Ssp for every predetermined period Tp, based on the average value of the subtraction result obtained by subtracting the intra-frame difference d'(t) from the threshold value DTH. That is to say, the stable image detecting unit 203 calculates a second stability score Ssp with the Expression (9). In Expression (9), t−Tp/2 indicates the starting point-in-time of a predetermined period Tp, and t+Tp/2 indicates the ending point-in-time of the predetermined period Tp. Also, in Expression (9), the DTL in the denominator is provided to perform normalizing so that Ssp=1 when d'(t)=0.

$$S_{sp} = \frac{\sum_{t=t-T_p/2}^{t+T_p/2}(D_{TH} - d'(t))}{T_P * D_{TL}} \quad (9)$$

When the intra-frame difference d'(t) is shown as in (a) in FIG. 15, the second stability score Ssp is computed as shown in (c) in FIG. 15. In this case, the smaller the intra-frame difference d'(t) is, the greater the second stability score Ssp is. By introducing the second stability score SSp, the most stable scene out of the above-described stable image segments can be selected as the playing segment.

The simple image detecting unit 204 computes a simplicity score corresponding to the simplicity of the image of each frame. The simple image detecting unit 204 computes a first simplicity score Sbi and second simplicity score Sbp. The simple image detecting unit 204 makes up the simplicity score computing unit.

First Simplicity Score Sbi

A computing method for the first simplicity score Sbi will be described. The simple image detecting unit 204 detects a simple image segment using a threshold value VT, based on the dispersion V(t) computed by the image feature extracting unit 201. In FIG. 16, (a) shows an example of the dispersion V(t) at each frame of the image data SV. The threshold value VT is set at a low level value, as shown in the diagram.

The simple image detecting unit 204 detects a segment wherein the dispersion V(t) is smaller than the threshold value VT as a simple image segment. The simple image detecting unit 204 computes a first simplicity score Sbi at the simple image segment, based on the average value of the subtraction results obtained by subtracting the dispersion V(t) from the threshold value V(t). That is to say, the simple image detecting unit 204 computes the first simplicity score Sbi with the Expression (10). In Expression (10), Ts indicates the starting point-in-time of a simple image segment, and Te indicates the ending point-in-time of the simple image segment. Also, in Expression (10), the VT in the denominator is provided to perform normalizing so that Sbi=1 when V(t)=0.

$$S_{bi} = \frac{\sum_{t=T_s}^{T_e}(V_T - V(t))}{(T_e - T_s)V_T} \quad (10)$$

When the dispersion V(t) is shown as in (a) in FIG. 16, the simple image segment is detected as shown in the diagram, and the first simplicity score Sbi is computed as shown in (b) in FIG. 16. The first simplicity score Sbi is 0 except for the simple image segment, and also, with the simple image segment the smaller the dispersion V(t) is and the simpler the image is, the greater the first simplicity score Sbi is.

Second Simplicity Score Sbp

A computing method for the second simplicity score Sbp will be described. The simple image detecting unit 204 computes a second simplicity score Sbp for every predetermined period Tp, based on the average value of the subtraction results obtained by subtracting the threshold value VT from the dispersion V(t). That is to say, the simple image detecting unit 204 computes a second simplicity score Sbp with the Expression (11). In Expression (11), t−Tp/2 indicates the starting point-in-time of a predetermined period Tp, and t+Tp/2 indicates the ending point-in-time of the predetermined period Tp. Note that the simple image detecting unit 204 sets as Sbp=Bmax when the second simplicity score Sbp computed in Expression (11) is greater than a predetermined value Bmax.

$$S_{bp} = \frac{\sum_{t=t-T_p/2}^{t+T_p/2}(V(t) - V_T)}{T_p} \quad (11)$$

When the dispersion V(t) is shown as in (a) in FIG. 16, the second simplicity score Sbp is computed as shown in (c) in FIG. 16. In this case, the greater the dispersion V(t) and the more complex the image is, the greater the second simplicity score Sbp is.

The similar image detecting unit 205 determines similarities in the images of each frame, and computes an appearance score Sid corresponding to appearance frequency and appearance time for each similar image. The similar image detecting unit 205 makes up the appearance scores computing unit. The similar image detecting unit 205 determines similarities of the images of each frame, based on the IDs (identifiers) appended to each frame with the image feature extracting unit 201. In this case, at the similar image detecting unit 205, images having the same ID appended thereto are determined to be similar.

The similar image detecting unit 205 computes an appearance score Sid for each similar image, i.e. for each ID, with the Expression (12).

$$Sid = fid/M + K \times Tid/Ttotal \quad (12)$$

In Expression (12), M represents the total number of same-ID segments in the content data, where continuous segments of frames having the same ID are a same-ID segment (see FIG. 7). Also, in Expression (12), fid represents the number of same-ID segments having target IDs of the M number of same-ID segments. Also, in Expression (12), Ttotal represents the total time of content data, and Tid represents the total time of same-ID segments having a target ID. Further, K is a predetermined coefficient.

In this case, the greater the number of same-ID segments having the target ID, i.e. the higher the appearance frequency of same-ID segments having the target ID in the content data, the greater the term of fid/M becomes and the greater the appearance score Sid becomes. Also, the longer the total time of same-ID segments having the target ID, i.e. the longer the appearance time of same-ID segments having the target ID in the content data, the greater the term of K*Tid/Ttotal becomes, and the greater the appearance score Sid becomes.

Note that instead of computing an appearance score Sid corresponding to the appearance frequency and an appearance time as described above, the similar image detecting unit 205 may compute an appearance score Sid corresponding to one or the other. For example, an appearance score Sid corresponding only to appearance frequency can be computed with Expression (13), and also, an appearance score Sid corresponding only to appearance time can be computed with Expression (14).

$$Sid = fid/M \tag{13}$$

$$Sid = Tid/\text{Total} \tag{14}$$

The face detecting unit 206 computes the face detecting score corresponding to the face image included in the image of each frame. The face detecting unit 206 computes a first face detecting score Sfp, a second face detecting score Sfs, and a third face detecting score Sfn, based on position information, size information, and number of faces information of the face image obtained in the detecting processing of the face image by the image feature extracting unit 201. The face detecting unit 206 herein makes up the face detecting score computing unit.

First Face Detecting Score Sfp

A computing method for the first face detecting score Sfp will be described. The face detecting unit 206 computes the first face detecting score Sfp, based on the position information of the face image. The face detecting unit 206 computes the first face detecting score Sfp for every predetermined period Tp. For each frame included in the predetermined period Tp, the face detecting unit 206 sets P=1 in the case that the center coordinates of the detected face image are included in a predetermined region, i.e. the screen center region, and in a case wherein this is not so, sets P=0. The face detecting unit 206 finds the average of the P values for each frame included in the predetermined period Tp, and sets the value thereof as the first face detecting score Sfp.

That is to say, the face detecting unit 206 computes the first face detecting score Sfp with the Expression (15). In Expression (15), t−Tp/2 indicates the starting point-in-time of the predetermined period Tp, and t+Tp/2 indicates the ending point-in-time of the predetermined period Tp. In this case, a face image is included in each frame of the predetermined period Tp, and when the center coordinates of the face image thereof are in the predetermined region, the first face detecting score Sfp becomes greater.

$$S_{fp} = \frac{\sum_{t=t-T_p/2}^{t+T_p/2} (P)}{T_p} \tag{15}$$

Second Face Detecting Score Sfs

A computing method for the second face detecting score Sfs will be described. The face detecting unit 206 computes the second face detecting score Sfs, based on the size information of the face image. The face detecting unit 206 computes the second face detecting score Sfs for every predetermined period Tp. For each frame included in the predetermined period Tp, the face detecting unit 206 finds the ratio of the area S of the detected face image as to a predetermined maximum area Smax. The face detecting unit 206 then finds the added average of the area ratio of the face images of each frame included in the predetermined period Tp, and sets the value thereof as the second face detecting score Sfs.

That is to say, the face detecting unit 206 computes the second face detecting score Sfs with the Expression (16). In Expression (16), t−Tp/2 indicates the starting point-in-time of the predetermined period Tp, and t+Tp/2 indicates the ending point-in-time of the predetermined period Tp. In this case, a face image is included in each frame of the predetermined period Tp, and when the area of the face image thereof is greater, the second face detecting score Sfs becomes greater.

$$S_{fs} = \frac{\sum_{t=t-T_p/2}^{t+T_p/2} \left(\frac{S}{S_{max}}\right)}{T_p} \tag{16}$$

Third Face Detecting Score Sfn

A computing method for the third face detecting score Sfn will be described. The face detecting unit 206 computes the third face detecting score Sfn, based on the number of faces information of the face image. The face detecting unit 206 computes the third face detecting score Sfn for every predetermined period Tp. For each frame included in the predetermined period Tp, the face detecting unit 206 finds the ratio of the number n of detected faces of the face image as to a predetermined maximum number nmax. The face detecting unit 206 then finds the added average of the area ratio of the number of faces of each frame included in the predetermined period Tp, and sets the value thereof as the third face detecting score Sfn.

That is to say, the face detecting unit 206 computes the third face detecting score Sfn with the Expression (17). In Expression (17), t−Tp/2 indicates the starting point-in-time of the predetermined period Tp, and t+Tp/2 indicates the ending point-in-time of the predetermined period Tp. In this case, a face image is included in each frame of the predetermined period Tp, and when the number of faces of the face image thereof is greater, the third face detecting score Sfn becomes greater.

$$S_{fn} = \frac{\sum_{t=t-T_p/2}^{t+T_p/2} \left(\frac{n}{n_{max}}\right)}{T_p} \tag{17}$$

The score calculating unit 207 computes a score Score(t) for each frame in the image data SV that is used with the scene selecting unit 208 and thumbnail selecting unit 209, based on each score computed with the stable image detecting unit 203, simple image detecting unit 204, similar image detecting unit 205, and face detecting unit 206. The score calculating unit 207 weights each score, thereby finding the score Score(t). In this case, a weight coefficient is determined according to the image to be selected for a scene, and a combination of scores to be added is determined. For example, if the weight coefficient Kbi of the first simplicity score Sbi is a negative value, the portion of the simple image can be proactively omitted from being selected as the playing segment from the content data.

Expression (18) shows an example of a computing expression in the case of computing the score Score(t) based on each score computed with the stable image detecting unit 203, simple image detecting unit 204, and similar image detecting unit 205. In Expression (18), Ksi, Ksp, Kbi, Kbp, and Kid indicate the weight coefficient of the score Ssi, Ssp, Sbi, Sbp, and Sid respectively. Also, in Expression (18), Koffset indicates an offset value.

$$Score(t)=KsiSsi(t)+KspSsp(t)+KbiSbi(t)+KbpSbp(t)+KidSid(t)+Koffset \quad (18)$$

Also, Expression (19) shows an example of a computing expression in the case of computing the score Score(t) based on each score computed with the stable image detecting unit 203, simple image detecting unit 204, and similar image detecting unit 205, as well as the face detecting unit 206. In Expression (19), Ksi, Ksp, Kbi, Kbp, Kid, Kfp, Kfs, and Kfn indicate the weight coefficient of the score Ssi, Ssp, Sbi, Sbp, Sid, Sfp, Sfs, and Sfn respectively. Also, in Expression (19), Koffset indicates an offset value.

$$Score(t)=KsiSsi(t)+KspSsp(t)+KbiSbi(t)+KbpSbp(t)+KfpSfp(t)+KfsSfs(t)+KfnSfn(t)+Koffset \quad (19)$$

The scene selecting unit 208 selects a playing segment (scene) to perform digest playing from the content data, based on the score Score(t) and so forth from each from computed by the score calculating unit 207. The scene selecting unit 208 makes up a playing segment selecting unit. The processing procedures of scene selection by the scene selecting unit 208 will be described.

Figure 17B:
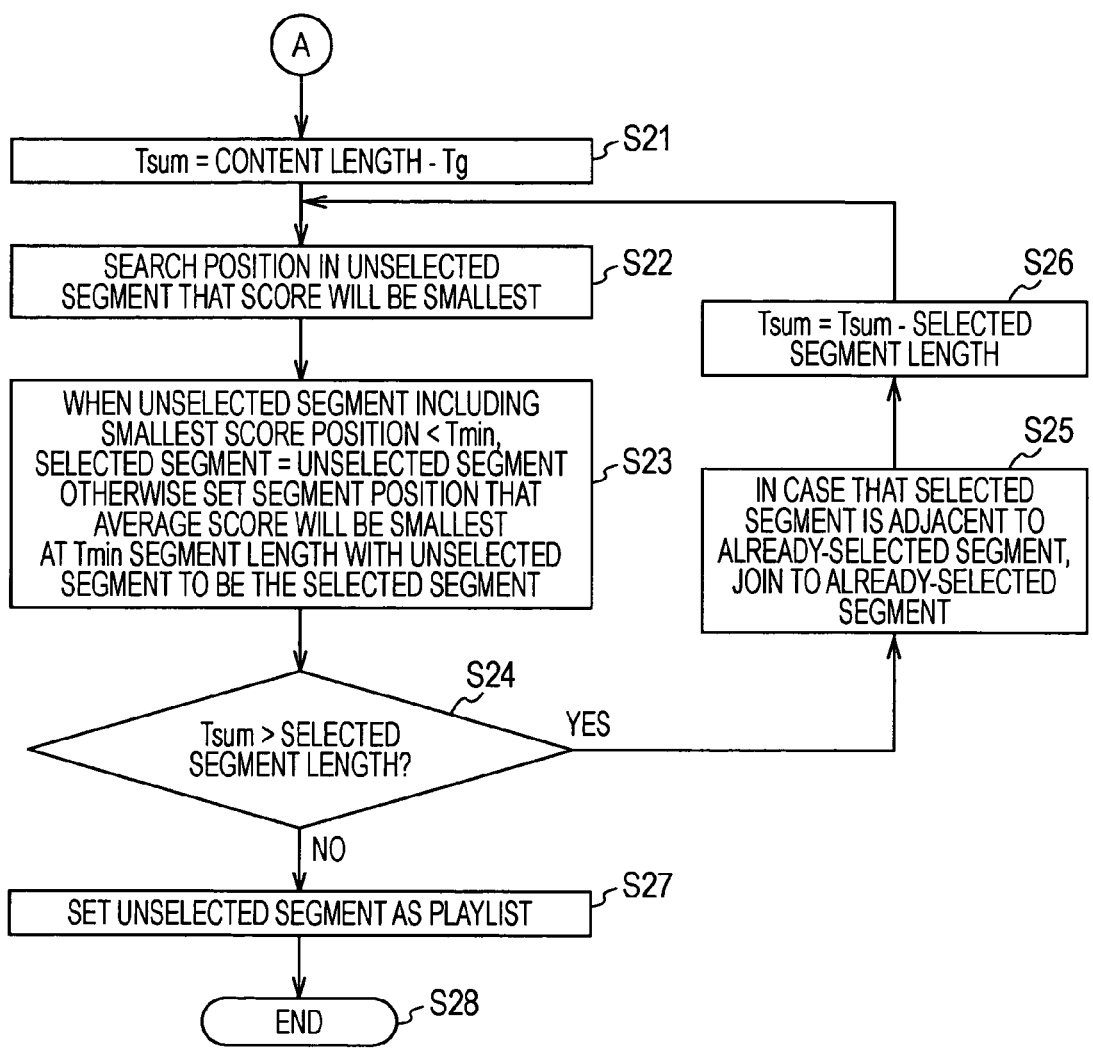
FIG. 17 is a flowchart describing an example of processing procedures for scene selection with a scene selecting unit of the content data processing unit.

The flowchart in FIG. 17 shows an example of the processing procedures for scene selection by the scene selecting unit 208. The scene selecting unit 208 starts scene selecting processing in step S1, and thereafter advances to the processing in step S2. In step S2, the scene selecting unit 208 finds the total time Ttotal of stable image segments. Note that although not described above, stable image segment detection information is supplied from the sable image detecting unit 203 to the scene selecting unit 208.

Next, the scene selecting unit 208 determines in step S3 whether or not a target time Tg is longer than the total time Ttotal. Now, the target time Tg means the total playing time that is targeted for digest playing. In the event that Tg>Ttotal does not hold, in step S4 the scene selecting unit 208 resets the Sum time Tsum of the selected segments to 0.

Next, the scene selecting unit 208 finds time Tavg in step S5. In this case, the scene selecting unit 208 computes time Tavg by subtracting the Sum time Tsum from the total time Ttotal, and dividing the subtraction result by the number of unselected stable image segments. In step S6 the scene selecting unit 208 searches for a position in the unselected stable image segments that the score Score(t) is greatest.

Next, in step S7 the scene selecting unit 208 determines whether or not the segment length is longer than time Tavg as to the unselected stable image segments including the maximum position of the score Score(t). In the event that "Tavg<segment length" holds, in step S8 the scene selecting unit 208 finds a segment that the average score of time Tavg segment length is maximum within the unselected stable image segments including the maximum position of the score Score(t), and selects the segment thereof.

On the other hand, in the event that "Tavg<segment length" does not hold, in step S9 the scene selecting unit 208 selects an unselected stable image segment. Following the processing in step S8, or following the processing in step S9, the scene selecting unit 208 advances the flow to the processing in step S10.

In step S10, the scene selecting unit 208 determines whether or not the target time Tg is longer than the time adding the selected segment length to the Sum time Tsum. In the event that "Tg>Tsum+selected segment length" does not hold, the sum of added time exceeds the target time Tg, whereby in step S11 the scene selecting unit 208 ends the scene selecting processing.

In the event that "Tg>Tsum+selected segment length" holds in step S10, the added time does not exceed the target time Tg, whereby the scene selecting unit 208 moves to the processing in step S12. In step S12, the scene selecting unit 208 changes the segments selected in the processing in step S8 or S9 to be already-selected.

Next, in step S13 the scene selecting unit 208 subtracts the score of the stable image segment including the segments selected in the processing in steps S8 or S9 by a predetermined value. Thus, the playing segment is suppressed from being selected multiple times from the same stable image segments.

Next, in step S14 the scene selecting unit 208 subtracts the appearance score Sid relating to the IDs appended to the frames of the segments selected in the processing in steps S8 or S9 by a predetermined value. Thus, the segments of similar frame images are suppressed from being selected as playing segments multiple times.

Next, the scene selecting unit 208 advances to the processing in step S15, and in the case that all of the unselected stable image segments are not selected, the segments are divided, and the segments not selected become new unselected stable image segments. Also, in the case that the selected segments in the processing in steps S8 or S9 are adjacent to an already-selected segment, in step S16 the scene selecting unit 208 joins the selected segment to the already-selected segment.

Next, in step S17 the scene selecting unit 208 adds the segments selected in the processing in steps S8 or S9 to the playlist as a playing segment. Also in step S17, the scene selecting unit 208 adds the selected segment length to the Sum time Tsum, and updates the Sum time Tsum. The scene selecting unit 208 returns to step S5 after the processing in step S17, and repeats the processing similar to that described above.

Also, in the event that Tg>Ttotal hold in step S3, the scene selecting unit 208 advances to the processing in step S21. In step S21, the scene selecting unit 208 sets the Sum time Tsum to a value wherein the target time Tg is subtracted from the content length (total time of content data). Following the processing in step S21, the scene selecting unit 208 advances the flow to the processing in step S22.

In step S22, the scene selecting unit 208 searches for a position in the unselected segments that the score Score(t) is smallest. Next, in step S23, when the unselected segment wherein the Score(t) includes the minimum position is shorter than minimum segment length Tmin, the scene selecting unit 208 sets the unselected segments thereof to be selected segments. Also, in the event that the unselected segment wherein the Score(t) includes the minimum position is at or greater than the minimum segment length Tmin, in step S23 the scene selecting unit 208 finds a segment that the average score of time Tmin segment length is smallest, and sets the segment thereof to be a selected segment.

Next, in step S24 the scene selecting unit 208 determines whether or not the Sum time Tsum is longer than the selected segment length. In the event that the Sum time Tsum is longer than the selected segment length, in the case that the selected segment in the processing in step S23 is adjacent to an already-selected segment, in step S25 the scene selecting unit 208 joins the selected segment to the already-selected segment.

Next, in step S26 the scene selecting unit 208 subtracts the selected segment length from the Sum time Tsum, and updates the total time Tsum. The scene selecting unit 208 returns to the processing in step S22 after the processing in step S26, and repeats processing that is similar to that described above.

Also, in the event that the Sum time Tsum is not longer that the selected segment in step S24, the unselected segment becomes shorter than the target time Tg, whereby the scene selecting unit 208 advances the flow to the processing in step S27. In step S27, the scene selecting unit 208 sets the unselected segments to be a playlist. In step S28, the scene selecting unit 208 then ends the scene selecting processing.

By performing scene selecting processing following along with the flowchart in FIG. 17, when the total time Ttotal of the stable image segments in the content data is at or greater than the target time Tg (total target playing time), the scene selecting unit 208 can select all of the playing segments for digest playing from the stable image segments. Also, by performing scene selecting processing following along with the flowchart in FIG. 17, when the total time Ttotal of the stable image segments in the content data is shorter than the target time Tg, the scene selecting unit 208 determines the playing segments by prioritizing and removing the segments with a small score Score(t). Therefore, the playing segments with a high score Score(t), e.g. stable image segments, can be selected.

Figure 18:
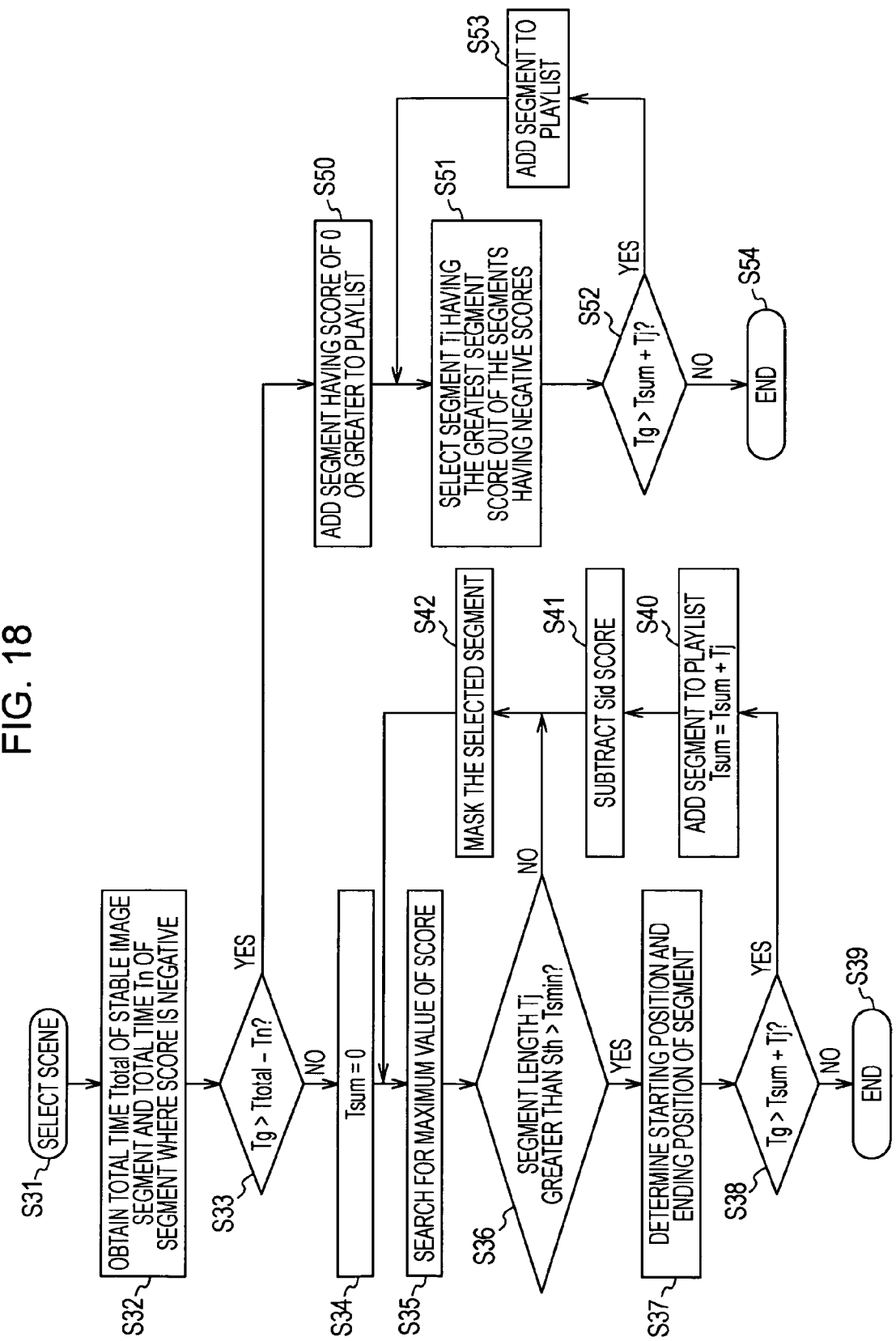
FIG. 18 is a flowchart describing another example of processing procedures for scene selection with the scene selecting unit of the content data processing unit.

The flowchart in FIG. 18 shows another example of processing procedures of scene selecting with the scene selecting unit 108. In step S31 the scene selecting unit 208 starts the scene selecting processing, and thereafter advances to the processing in step S32. In step S32, the scene selecting unit 208 finds a total time Tn of segments with a negative score Score(t).

Next, in step S33 the scene selecting unit 208 determines whether or not the target time Tg is longer than the time obtained by subtracting the total time Tn from the total time Ttotal of the stable image segments. In the event that Tg>Ttotal−Tn does not hold, i.e. when the total time of the segments having a score Score(t) of 0 or greater is longer than the target time Tg, in step S34 the scene selecting unit 208 resets the Sum time Tsum of the selected segments to 0.

Next, in step S35 the scene selecting unit 208 searches for the maximum value of the score Score(t). In step S36, the scene selecting unit 208 determines whether or not a segment length Tj of the segment wherein the maximum score is at or above a threshold value Sth and the score Score(t) including the maximum score is at or above a threshold value Sth is longer than the minimum segment length Tmin.

In the event that the segment length Tj is longer than the minimum segment length Tmin, the scene selecting unit 208 advances the flow to the processing in step S37. In step S37, the scene selecting unit 208 determines the starting position and ending position of a segment that the score Score(t) is at or above the threshold value Sth. In step S38, the scene selecting unit 208 determines whether or not the target time Tg is longer than the time wherein the segment length Tj is added to the Sum time Tsum. In the event that Tg>Tsum+Tj does not hold, the sum of added time exceeds the target time Tg, whereby in step S39, the scene selecting unit 208 ends the scene selecting processing.

In the event that Tg>Tsum+Tj holds, the added time does not exceed the target time Tg, whereby the scene selecting unit 208 advances the flow to the processing in step S40. In step S40, the scene selecting unit 208 adds a segment having determined the starting position and ending position thereof in step S37 to the playlist. Also, in step S40 the scene selecting unit 208 adds the segment length Tj to the Sum time Tsum, and updates the Sum time Tsum.

Next, the scene selecting unit 208 subtracts the appearance score Sid relating to the ID appended to the frames of the segments (selected segment) of the segment length Tj added to the playlist in step S41, by a predetermined value. Thus, the segments of similar frame images are suppressed from being selected as playing segments multiple times.

Next, in step S42 the scene selecting unit 208 masks the selected segment, whereby the segment is prevented from being selected as a duplicate. Following the processing in step S42, the scene selecting unit 208 returns to step S35, and repeats the processing similar to that described above.

Also, in the event that Tg>Ttotal−Tn holds in step S33, i.e. when the total time of the segment having a score Score(t) of 0 or greater is shorter than the target time Tg, the scene selecting unit 208 advances to the processing in step S50. In step S50, the scene selecting unit 208 adds the segment having a score Score(t) of 0 or greater to the playlist. Also, in step S50, the scene selecting unit 208 subtracts the total time Tn from the Sum time Tsum, and updates the Sum time Tsum.

Next, in step S51, the scene selecting unit 208 selects a segment having the greatest segment score Score(t) (segment length Tj) out of the periods in which the scores Score(t) are negative. In step S52, the scene selecting unit 208 determines whether or not the target time Tg is longer than the time wherein the segment length Tj is added to the Sum time Tsum. In the event that Tg>Tsum+Tj does not hold, the total of the added time exceeds the target time Tg, whereby the scene selecting unit 208 ends the scene selecting processing in step S54.

In the event that Tg>Tsum+Tj holds in step S52, the added time does not exceed the target time Tg, whereby the scene selecting unit 208 advances the flow to the processing in step S53. In step S53, the scene selecting unit 208 adds the segments selected in step S51 to the playlist. Also in step S 53 the scene selecting unit 208 adds the segment length Tj to the Sum time Tsum and updates the Sum time Tsum. Following the processing in step S53, the scene selecting unit 208 returns to the processing in S51 and repeats the processing similar to that described above.

By performing scene selecting processing following along with the flowchart in FIG. 18, when the total time of the segments in the content data wherein the score Score(t) is greater than 0 is at or greater than the target time Tg (total target playing time), the scene selecting unit 208 can select all of the playing segments for digest playing from the segments wherein the score Score(t) is greater than 0. Also, by performing scene selecting processing following along with the flowchart in FIG. 18, when the total time of the segments in the content data wherein the score Score(t) is greater than 0 is shorter than the target time Tg, the scene selecting unit 208 selects all of the segments wherein the score Score(t) is greater than 0, and also selects the segments having a high score Score(t) out of the segments having a negative score Score(t), as playing segments. Therefore, overall, the segments with a high score Score(t), e.g. stable image segments, can be selected as playing segments.

The thumbnail selecting unit 209 selects an image data frame making up a thumbnail of the content data, based on information of the score Score(t) of each frame computed by the score calculating unit 207 and information of the playing segments selected by the scene selecting unit 208, and creates a thumbnail list.

The thumbnail selecting unit 209 detects a frame wherein the score Score(t) is maximum in the stable image segments as a thumbnail data frame, for example. Also, the thumbnail selecting unit 209 detects a frame wherein the score Score(t) is maximum in each playing segment selected in the scene selecting unit 208 as described above as a thumbnail data frame, for example. Also, the thumbnail selecting unit 209 detects a thumbnail data frame from the image segments having an ID that is the highest appearance score Sid.

Operation of Content Data Processing Unit

Next, the operations of the content data processing unit 105 will be described. The image data SV making up the content data from which a list is created is supplied to the image feature extracting unit 201. The image data SV is processed by the image feature extracting unit 201, and various types of features information used for processing of the various detecting units at a later stage are generated.

That is to say, at the image feature extracting unit 201, the intra-frame difference d(t) is computed for each frame of the image data SV for the processing of the cut border detecting unit 202. Also at the image feature extracting unit 201, the intra-frame difference d'(t) is computed from which peaks and noise in pulse form are removed by applying a median filter to the intra-frame difference d(t) for the processing of the stable image detecting unit 203.

Also, at the image feature extracting unit 201, the dispersion V(t) which is a statistical processing value is computed for each frame of the image data SV for the processing of the simple image detecting unit 204. Also, at the image feature extracting unit 201, similarities between the images of each frame are detected and the same ID (identifier) for each frame having a similar image is appended, for the processing at the similar image detecting unit 205. Also, at the image feature extracting unit 201, a face image is detected for each frame of the image data SV for the processing of the face detecting unit 206, and the position information, size information, and number of faces information of a face image is obtained.

The intra-frame difference d(t) computed at the image feature extracting unit 201 is supplied to the cut border detecting unit 202. At the cut border detecting unit 202, for example, the frame wherein the intra-frame difference d(t) becomes a peak PP in pulse form is detected as the frame making up the cut border.

Also, the intra-frame difference d'(t) computed at the image feature extracting unit 201 and the cut border information obtained with the cut border detecting unit 202 are supplied to the stable image detecting unit 203. At the stable image detecting unit 203, the first stability score Ssi and second stability score Ssp corresponding to the stability of the image of each frame is computed.

That is to say, at the stable image detecting unit 203, the first stability score Ssi is computed in a stable image segment, based on the average value of the subtraction results obtained by subtracting the intra-frame difference d'(t) from the threshold value DTL. Also, a the stable image detecting unit 203, the second stability score Ssp is computed for every predetermined period Tp, based on the average value of the subtraction results obtained by subtracting the intra-frame difference d'(t) from the threshold value DTH.

Also, the dispersion V(t) computed at the image feature extracting unit 201 is supplied to the simple image detecting unit 204. At the simple image detecting unit 204, the first simplicity score Sbi and second simplicity score Sbp corresponding to the simplicity of the image of each frame are computed.

That is to say, at the simple image detecting unit 204, the first simplicity score Sbi is computed in a simple image segment, based on the average value of the subtraction results obtained by subtracting the dispersion V(t) from the threshold value V(t). Also, at the simple image detecting unit 204, the second simplicity score Sbp is computed for every predetermined period Tp, based on the average value of the subtraction results obtained by subtracting the threshold value V(t) from the dispersion V(t).

Also, ID appending information to each frame of the image data SV at the image feature extracting unit 201 is supplied to the similar image detecting unit 205. At the similar image detecting unit 205, the similarity of images of each frame is distinguished by ID, and an appearance score Sid corresponding to the appearance frequency and appearance time is computed for every similar image, i.e. for every ID.

Also, the face image information (position information, size information, and number of faces information) detected by the image feature extracting unit 201 is supplied to the face detecting unit 206. At the face detecting unit 205, a first face detecting score Sfp, second face detecting score Sfs, and third face detecting score Sfn are computed, based on the position information, size information, and number of faces information of the face image. That is to say, at the face detecting unit 206, for each frame included in the predetermined period Tp, P=1 in the case that the center coordinates of the detected face image are included a predetermined region, e.g. the center region of the screen, and P=0 otherwise. The added average of P values for each frame included in the predetermined period Tp is found as the first face detecting score Sfp.

Also, at the face detecting unit 206, a ratio is found in each frame included in the predetermined period Tp, as to a predetermined maximum area Smax of the area S of the detected face image, and the added average of the area ratio of the face image of each frame included in the predetermined period Tp is found as the second face detecting score Sfs. Also, at the face detecting unit 206, a ratio is found in each frame included in the predetermined period Tp, as to a predetermined maximum number of detections nmax where a detection number n of images are in the face image, and the added average of the area ratio of number of detections of each frame included in the predetermined period Tp is found as the third face detecting score Sfn.

Each score computed by the detecting units 203 through 206 are supplied to the score calculating unit 207. In the score calculating unit 207, based on each score, the score Score(t) for each frame of the image data SV is calculated that is used with the scene selecting unit 208 and thumbnail selecting unit 209. In this case, for example, by user operations, the combination of scores to be added is determined according to the scene desired for selection, while a weight coefficient is determined for each score.

The score Score(t) computed by the score calculating unit 207 is supplied to the scene selecting unit 208 and thumbnail selecting unit 209. Also, other information that is used is supplied from the various units to the scene selecting unit 208 and thumbnail selecting unit 209.

With the scene selecting unit 208, playing segments (scenes) for performing digest playing are selected from the content data based on the score Score(t) and so forth of each frame computed by the score calculating unit 207, and a playlist is created. The playlist thus selected by the scene selecting unit 208 is held in the memory unit 101b within the control unit 101. The playlist is used as playing position information at the time of digest playing, as described above.

Also, with the thumbnail selecting unit 209, image data frames making up the thumbnail of the content data are selected, based on score Score(t) information for each frame computed by the score calculating unit 207, playing segment information selected by the scene selecting unit 208, and so forth, and a thumbnail list is created. The thumbnail list thus selected by the thumbnail selecting unit 209 is held in the memory unit 101b within the control unit 101. The thumbnail list is used to obtain frame image data in the event of displaying the thumbnail of the content data.

As described above, at the content data processing unit 105 shown in FIG. 2, the score calculating unit 207 calculates a score Score(t) for each frame, including the stability scores Ssi and Ssp corresponding to the stability of the image of each frame from the sable image detecting unit 203. At the content data processing unit 105 shown in FIG. 2, the scene selecting unit 208 selects a playing segment (scene) to perform digest playing based on the score Score(t), and generates a playlist. Accordingly, at the content data processing unit 105 shown in FIG. 2, a stable image portion can be selected as a playing segment for performing digest playing, and for example an image portion that is distorted by hand shaking or the like can be avoided from being selected.

Also, at the content data processing unit 105 shown in FIG. 2, the score calculating unit 207 calculates a score Score(t) for each frame, including the stability scores Ssi and Ssp corresponding to the stability of the image of each frame from the simple table image detecting unit 204. At the content data processing unit 105 shown in FIG. 2, the scene selecting unit 208 selects a playing segment (scene) to perform digest playing based on the score Score(t), and generates a playlist. Accordingly, at the content data processing unit 105 shown in FIG. 2, simple image segments that are photos of the ground or the sky or photos with the lens cap still on or the like can be avoided from being selected as playing segments for performing digest playing.

Also, at the content data processing unit 105 shown in FIG. 2, the score calculating unit 207 calculates a score Score(t) for each frame, including the appearance score Sid that corresponds to the appearance frequency and appearance time for every similar image (for every ID) from the similar image detecting unit 205. At the content data processing unit 105 shown in FIG. 2, the scene selecting unit 208 selects a playing segment (scene) for performing digest playing, based on the score Score(t), and generates a playlist. Accordingly, with the content data processing unit 105 shown in FIG. 2, image segments that have a high appearance frequency, or that have a long appearance time, can more readily be selected as playing segments.

Also, at the content data processing unit 105 shown in FIG. 2, the score calculating unit 207 calculates a score Score(t) for each frame, including the face detecting scores Sfp, Sfs, and Sfn that correspond to the face image included in the images of each frame from the face detecting unit 205. At the content data processing unit 105 shown in FIG. 2, the scene selecting unit 208 selects a playing segment (scene) for performing digest playing, based on the score Score(t), and generates a playlist. Accordingly, with the content data processing unit 105 shown in FIG. 2, image segments wherein a face exists can more readily be selected as playing segments.

Another Configuration Example of Content Data Processing Unit

Figure 19:
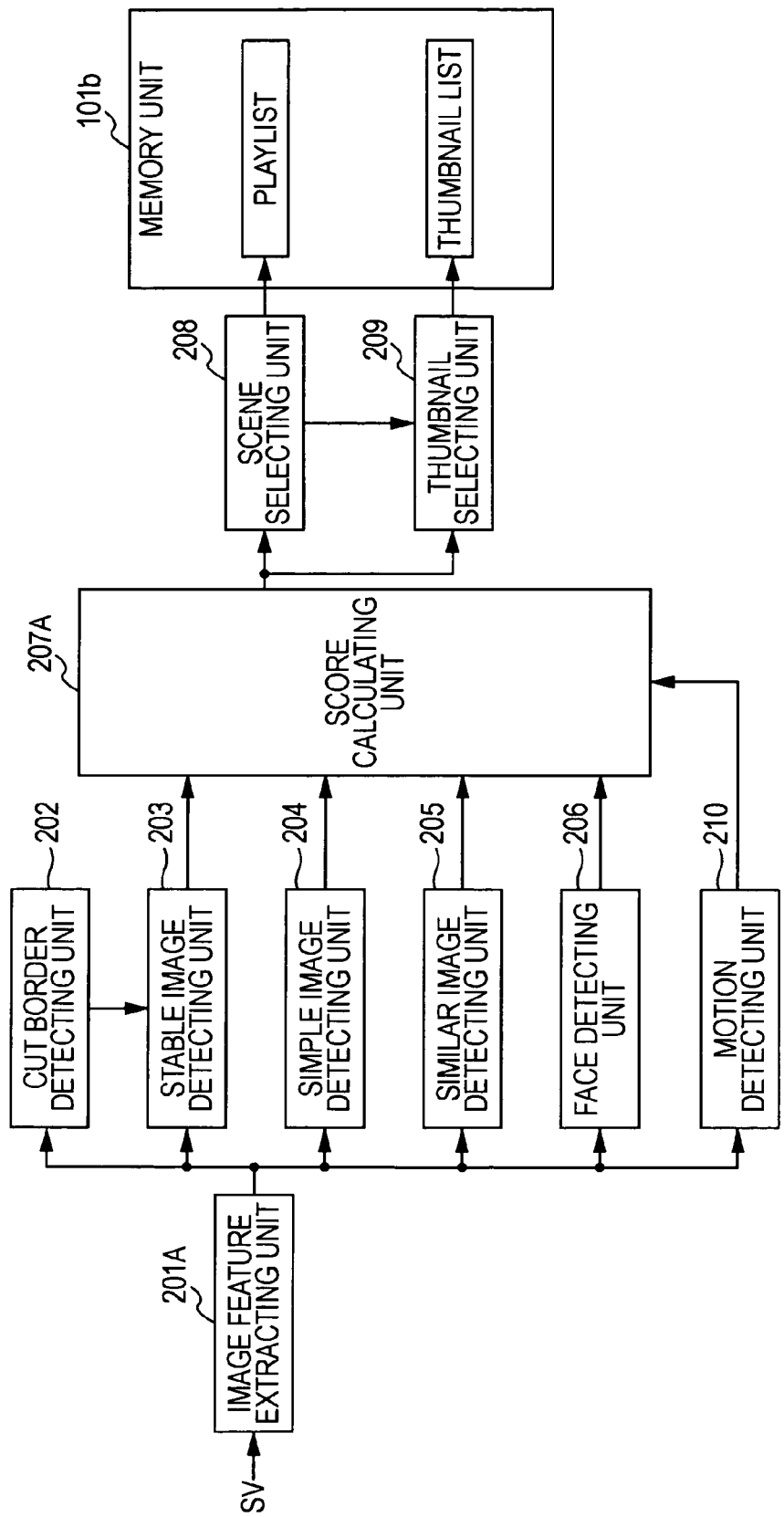
FIG. 19 is a block diagram illustrating another configuration example of the content data processing unit.

Next, another configuration example of the content data processing unit 105 will be described. FIG. 19 shows another configuration example of the content data processing unit 105. In FIG. 19, the portions corresponding to FIG. 2 have the same reference numerals appended thereto. The content data processing unit 105 shows an example of processing only the image data, and creating a playlist and thumbnail list, similar to the content data processing unit 105 shown in FIG. 2.

In FIG. 19, the content data processing unit 105 has an image feature extracting unit 201A, cut border detecting unit 202, stable image detecting unit 203, simple image detecting unit 204, similar image detecting unit 205, and face detecting unit 206. Also, the content data processing unit 105 has a score calculating unit 207A, scene selecting unit 208, thumbnail selecting unit 209, and motion detecting unit 210.

The image feature extracting unit 201 of the content data processing unit 105 shown in FIG. 2 performs computing processing of the intra-frame differences d(t) and d'(t), computing processing of the dispersion V(t), ID appending processing, and face image detecting processing. On the other hand, the image feature extracting unit 201A of the content data processing unit 105 shown in FIG. 19 performs motion vector detecting processing, as well as computing processing of the intra-frame differences d(t) and d'(t), computing processing of the dispersion V(t), ID appending processing, and face image detecting processing.

For example, in the case that MPEG (Moving Picture Expert Group) motion vector information is appended to the image data SV, the image feature extracting unit 201A uses the motion vector information thereof to detect the motion vectors in each frame of the image data SV. Also, for example, the image feature extracting unit 201A detects the motion vectors in each frame of the image data SV, with a currently used method such as a block matching method or the like.

The motion detecting unit 210 detects an identified camera motion such as zooming, panning, tilting, or the like, based on the motion vectors for each frame of the image data SV, as detected by the image feature extracting unit 201A. In this case, the motion detecting unit 210 computes the camera motion feature data by subjecting the motion vectors to affine transformation, as is commonly done, and determines whether or not the motion is an identified camera motion based on the camera motion feature data (see PCT Japanese Translation Patent No. 2005-513929 and Japanese Unexamined Patent Application Publication No. 2003-298981).

The score calculating unit 207 of the content data processing unit 105 shown in FIG. 2 computes scores Score(t) based on each score computed by the stable image detecting unit 203, simple image detecting unit 204, similar image detecting unit 205, and face detecting unit 206, as described above. On the other hand, the score calculating unit 207A of the content data processing unit 105 shown in FIG. 19 computes scores Score(t) based on each score computed by the stable image detecting unit 203, simple image detecting unit 204, similar image detecting unit 205, and face detecting unit 206, but in the event thereof, adjusts the value of the second stability score Ssp computed with the stable image detecting unit 203, based on the detection output of the motion detecting unit 210.

That is to say, with the score calculating unit 207A, each frame detected by the motion detecting unit 210 to be an identified camera motion such as zooming, panning, tilting and the like is adjusted and used so that the second stability score Ssp computed by the stable image detecting unit 203 increases. In this case, the score calculating unit 207A makes up the score adjusting unit.

The other portions of the content data processing unit 105 shown in FIG. 19 are made up similar to the content data processing unit 105 shown in FIG. 2, and operate similarly thereto.

Imaged images that are taken with identified camera motions such as zooming, panning, and tilting, are often important scenes. In this case, the image is moving, so the second stability score Ssp computed by the stable image detecting unit 203 decreases. Therefore, the segments of the images that are taken with identified camera motions are less likely to be selected as playing segments for digest playing.

However, as with the content data processing unit 105 shown in FIG. 19, each frame detected as an identified camera motion is adjusted and used so that the second stability score Ssp computed by the stable image detecting unit 203 increases, whereby segments of the images taken with identified camera motions such as zooming, panning, and tilting are suppressed from being excluded as playing segments.

Another Configuration Example of Content Data Processing Unit

Figure 20:
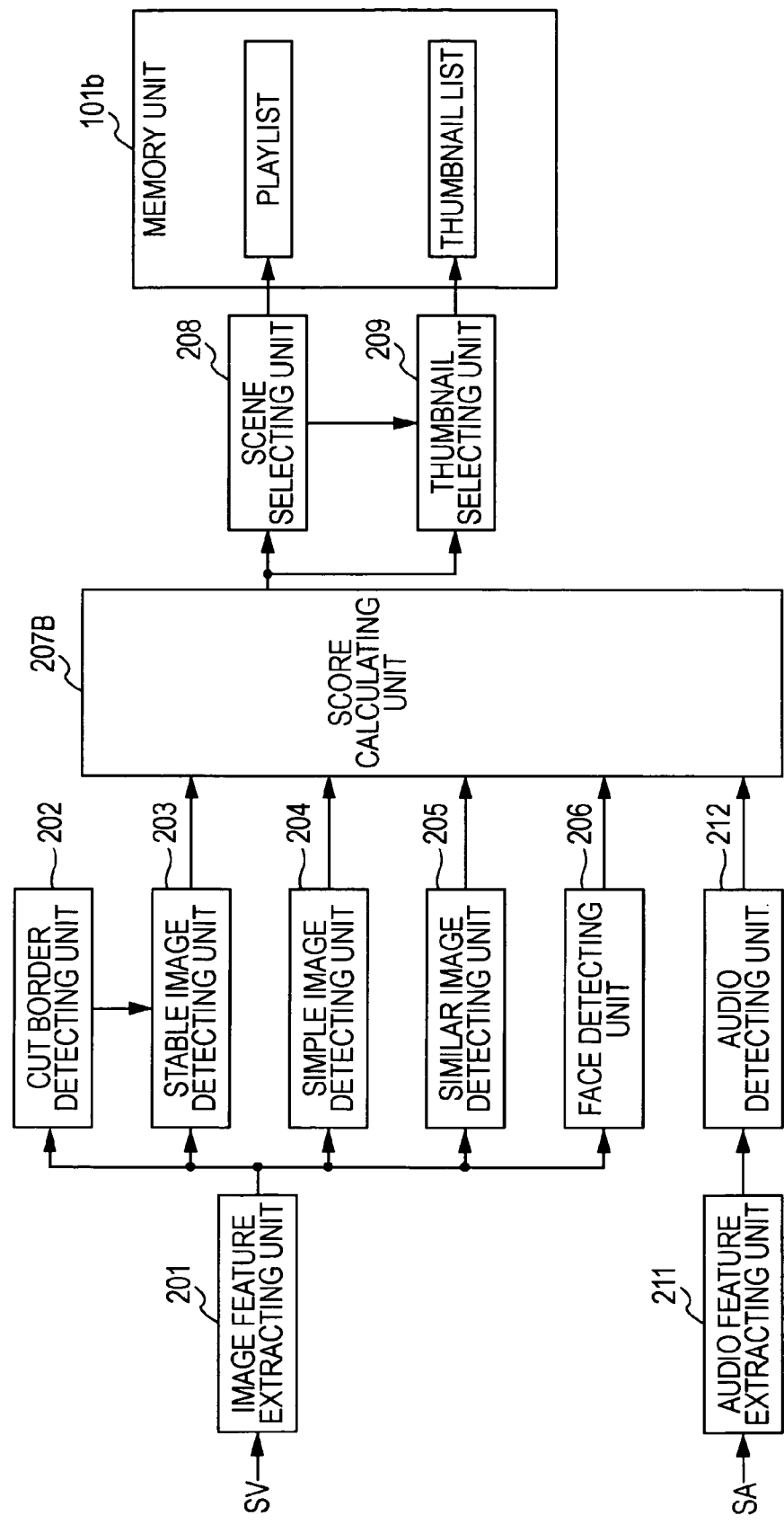
FIG. 20 is a block diagram illustrating another configuration example of the content data processing unit.

Next, yet another configuration example of the content data processing unit 105 will be described. FIG. 20 shows another configuration of the content data processing unit 105. In FIG. 20, the portions corresponding to FIG. 2 have the same reference numerals appended thereto. The content data processing unit 105 herein differs from the content data processing unit 105 shown in FIG. 2, and is an example that processes audio data as well as image data to create a playlist and thumbnail list.

In FIG. 20 the content data processing unit 105 has an image feature extracting unit 201, cut border detecting unit 202, stable image detecting unit 203, simple image detecting unit 204, similar image detecting unit 205, and face detecting unit 206. Also, the content data processing unit 105 has a score calculating unit 207B, scene selecting unit 208, and thumbnail selecting unit 209. Also, the content data processing unit 105 has an audio feature extracting unit 211 and audio detecting unit 212.

The audio feature extracting unit 211 detects audio features corresponding to each frame of the image data SV for processing of the audio detecting unit 212, based on audio data SA corresponding to the image data SV. For example, the audio feature extracting unit 211 detects audio level as an audio feature.

The audio detecting unit 212 computes audio scores corresponding to the audio features, based on audio features detected by the audio feature extracting unit 211. In this case, with the audio detecting unit 212, for example, in the case that the audio feature is audio level, the audio score is computed so that the score becomes larger as the audio level becomes greater. The audio detecting unit 212 makes up the audio score computing unit.

The score calculating unit 207 of the content data processing unit 105 shown in FIG. 2 computes scores Score(t) for each score computed with the stable image detecting unit 203, simple image detecting unit 204, similar image detecting unit 205, and face detecting unit 206. On the other hand, the score calculating unit 207A of the content data processing unit 105 shown in FIG. 20 computes scores Score(t) for each score computed with the stable image detecting unit 203, simple image detecting unit 204, similar image detecting unit 205, and face detecting unit 206, in addition to audio scores computed with the audio detecting unit 212.

The other portions of the content data processing unit 105 shown in FIG. 20 are made up similar to the content data processing unit 105 shown in FIG. 2, and are similarly operated. A stability score, simplicity score and so forth, as well as an audio score is introduced in the content data processing unit 105 shown in FIG. 20 to calculate the score Score(t), whereby, for example the segments of the images with higher audio level are more likely to be selected as playing segments.

The various function portions of the content data processing unit 105 according to the above-described embodiment can be realized with either hardware or software. In the case of realizing with software, a computer executes processing for the various function portions based on a program stored in a ROM or hard disk.

FIG. 21 is a diagram showing an internal configuration example of a computer 500 to execute such processing. A CPU (Central Processing Unit) 501 executes various types of processing according to the program stored in the ROM (Read Only Memory) 502. Data and programs for the CPU 501 to execute various types of processing is stored in the RAM (Random Access Memory) 503 as appropriate.

An input/output interface 505 is connected to the above-described CPU 501, ROM 502, and RAM 503, as well as a bus 504. The input/output interface 505 is connected to an input unit 506 made up of a keyboard and mouse. The input/output interface 505 outputs signals input from the input unit 506 to the CPU 501. Also, the input/output interface 505 is connected to an output unit 507 made up of a display, speaker, and so forth.

Also, the input/output interface 505 is connected to a storage unit 508 made up of a hard disk or the like and a communication unit 509 to perform data communication with other devices via a network such as the Internet. The drive 510 reads out data from the storage medium such as a magnetic disk, optical disk, magneto-optical disk, semiconductor memory and the like, or is used to write data therein. The image data SV and audio data SA that make up the content data for list creation is taken in by the communication unit 509 or drive 510 for example, and is stored in a storage unit 508 made up from a hard disk or the like.

Also, according to the above-described embodiment, the present invention is applicable to a recording/playing device 100 wherein a DVD 107 serves as the recording medium, but it goes without saying that the present invention can be applied to other recording media, e.g. recording/playing device that handles a hard disk, semiconductor memory, and so forth. Also, the present invention can be similarly applied to an imaging apparatus or the like having a similar recording/playing device.

It should be understood by those skilled in the art that various modifications, combinations, sub-combinations and alterations may occur depending on design requirements and other factors insofar as they are within the scope of the appended claims or the equivalents thereof.

What is claimed is:

1. A content data processing device comprising:
   a stability score computing unit to compute a stability score corresponding to stability of an image for each frame, based on image data of each frame making up content data; and
   a playing segment selecting unit to select a playing segment from said content data based on the stability score computed with the stability score computing unit,
   wherein said stability score computing unit:
   detects a segment wherein an intra-frame difference is smaller than a first threshold,
   sets the segment thereof as a stabile image segment in the event the segment thereof is longer than a predetermined segment length,
   computes a first stability score of said stable image segment based on an average value of subtraction results obtained by subtracting said intra-frame difference from said first threshold; and
   computes a second stability score based on an average value of subtraction results obtained by subtracting said intra-frame difference from said second threshold which is greater than said first threshold, at each predetermined period.

2. The content data processing device according to claim 1, wherein said playing segment selecting unit selects all of said playing segments from said stable image segments, in the event that the total time of said stable image segments in said content data is greater than a target total playing time.

3. The content data processing device according to claim 1, further comprising:
a simplicity score computing unit to compute a simplicity score corresponding to the simplicity of images of each frame, based on image data of each frame making up said content data;
wherein said playing segment selecting unit selects said playing segments from said content data, based on said stability core computed by said stability score computing unit and the simplicity score computed by said simplicity score computing unit.

4. The content data processing device according to claim 3, further comprising:
an appearance score computing unit to
determine similar images in each frame and
compute an appearance score corresponding to at least the appearance frequency or appearance time for each similar image,
based on image data of each frame making up said content data;
wherein said playing segment selecting unit selects said playing segments from said content data, based on the stability score computed by said stability score computing unit, the simplicity score computed by said simplicity score computing unit, and the appearance score computed by said appearance score computing unit.

5. The content data processing device according to claim 4, wherein said playing segment selecting unit subtracts a predetermined value from the appearance score computed by said appearance score computing unit corresponding to the images included in a predetermined playing segment when the predetermined playing segment is selected.

6. The content data processing device according to claim 3, further comprising:
a camera motion detecting unit to detect camera motion associated with each frame of the image data making up said content data; and
a score adjusting unit to adjust in the direction that the stability score computed with said stability score computing unit increases in the event that identified camera motion is detected by said camera motion detecting unit.

7. The content data processing device according to claim 1, further comprising:
a camera motion detecting unit to detect camera motion associated with each frame of the image data making up said content data; and
a score adjusting unit to adjust in the direction that the stability score computed with said stability score computing unit increases in the event that identified camera motion is detected by said camera motion detecting unit.

8. A content data processing device comprising:
a stability score computing unit to compute a stability score corresponding to the stability of an image for each frame, based on the image data of each frame making up content data;
a playing segment selecting unit to select a playing segment from said content data based on the stability score computed with the stability score computing unit; and
a simplicity score computing unit to compute a simplicity score corresponding to the simplicity of images of each frame, based on image data of each frame making up said content data,
wherein said playing segment selecting unit selects said playing segments from said content data, based on stability core computed by said stability score computing unit and the simplicity score computed by said simplicity score computing unit, and
wherein said simplicity score computing unit:
detects a segment wherein a dispersion of luminance values for each pixel included in a detection region set within a screen or a statistical processing value of standard deviation is smaller than a threshold,
sets this segment as a simple image segment, and
computes a first simplicity score based on an average value of subtraction results obtained by subtracting said statistical processing value from said threshold in said simple image segment; and
computes a second simplicity score based on an average value of subtraction results obtained by subtracting said threshold from said statistical processing value, at each predetermined period, in the event that said statistical processing value is greater than said threshold in said predetermined period.

9. A content data processing device comprising:
a stability score computing unit to compute a stability score corresponding to stability of an image for each frame, based on image data of each frame making up content data; and
a playing segment selecting unit to select a playing segment from said content data based on the stability score computed with the stability score computing unit,
further comprising:
a simplicity score computing unit to compute a simplicity score corresponding to the simplicity of images of each frame, based on image data of each frame making up said content data,
and further comprising:
a face detecting score computing unit to
detect a face image included in images of each frame, and
compute a face detecting score corresponding to at least the position, size, and number of faces of the face image,
based on the image data of each frame making up said content data;
wherein said playing segment selecting unit selects said playing segment from said content data, based on
said stability score computed by said stability score computing unit,
said simplicity score computed by said simplicity score computing unit, and
a face detecting score computed by said face detecting score computing unit.

10. A content data processing device comprising:
a stability score computing unit to compute a stability score corresponding to stability of an image for each frame, based on image data of each frame making up content data; and
a playing segment selecting unit to select a playing segment from said content data based on the stability score computed with the stability score computing unit,
further comprising:
a simplicity score computing unit to compute a simplicity score corresponding to the simplicity of images of each frame, based on image data of each frame making up said content data,
and further comprising:
an audio score computing unit to
detect audio features of each frame, and
compute an audio score corresponding to the audio features,
based on audio data corresponding to the image data of each frame making up said content data;
wherein said playing segment selecting unit selects said playing segment from said content data, based on said stability score computed by said stability score computing unit, said simplicity score computed by said simplicity score computing unit, and an audio score computed by said audio score computing unit.

11. A content data processing method comprising the steps of:

computing of a stability score corresponding to the stability of an image for each frame, based on the image data of each frame making up content data; and selecting of a playing segment from said content data based on the stability score computed in the stability score computing step, wherein the computing step:

detects a segment wherein an intra-frame difference is smaller than a first threshold, sets the segment thereof as a stabile image segment in the event the segment thereof is longer than a predetermined segment length, computes a first stability score of said stable image segment based on an average value of subtraction results obtained by subtracting said intra-frame difference from said first threshold, and computes a second stability score based on an average value of subtraction results obtained by subtracting said intra-frame difference from said second threshold which is greater than said first threshold, at each predetermined period.

12. A non-transitory computer readable memory having stored thereon a program causing a computer to function as:

stability score computing means to compute a stability score corresponding to the stability of an image for each frame, based on the image data of each frame making up content data; and playing segment selecting means to select a playing segment from said content data based on the stability score computed with the stability score computing means, wherein said stability score computing means:

detects a segment wherein an intra-frame difference is smaller than a first threshold, sets the segment thereof as a stabile image segment in the event the segment thereof is longer than a predetermined segment length, computes a first stability score of said stable image segment based on an average value of subtraction results obtained by subtracting said intra-frame difference from said first threshold, and computes a second stability score based on an average value of subtraction results obtained by subtracting said intra-frame difference from said second threshold which is greater than said first threshold, at each predetermined period.

13. A recording/playing device comprising:

a recording/playing unit to record content data in a recording medium and to play said content data from said recording medium;

a content data processing unit to perform processing that selects playing segments for digest playing from said recording medium or from said content data recorded on said recording medium;

wherein said content data processing unit includes a stability score computing unit to compute a stability score corresponding to the stability of the images of each frame, based on the image data of each frame making up said content data and a playing segment selecting unit to select said playing segment from said content data based on the stability score computed with said stability score computing unit, wherein said stability score computing unit:

detects a segment wherein an intra-frame difference is smaller than a first threshold, sets the segment thereof as a stabile image segment in the event the segment thereof is longer than a predetermined segment length, computes a first stability score of said stable image segment based on an average value of subtraction results obtained by subtracting said intra-frame difference from said first threshold, and computes a second stability score based on an average value of subtraction results obtained by subtracting said intra-frame difference from said second threshold which is greater than said first threshold, at each predetermined period.

14. A non-transitory computer readable memory having stored thereon a program causing a computer to function as:

a stability score computing unit to compute a stability score corresponding to the stability of an image for each frame, based on the image data of each frame making up content data; and a playing segment selecting unit to select a playing segment from said content data based on the stability score computed with the stability score computing unit, wherein said stability score computing unit:

detects a segment wherein an intra-frame difference is smaller than a first threshold, sets the segment thereof as a stabile image segment in the event the segment thereof is longer than a predetermined segment length, computes a first stability score of said stable image segment based on an average value of subtraction results obtained by subtracting said intra-frame difference from said first threshold, and computes a second stability score based on an average value of subtraction results obtained by subtracting said intra-frame difference from said second threshold which is greater than said first threshold, at each predetermined period.

* * * * *